United States Patent
Kuznetsov

[19]

[11] Patent Number: 5,822,086
[45] Date of Patent: Oct. 13, 1998

[54] METHOD AND DEVICE FOR ADAPTIVE SCREENING OF CONTINUOUS TONE ORIGINALS

[76] Inventor: Jury V. Kuznetsov, 12 Linija, d. 31, kv.4, 199178 Sankt Petersburg, Russian Federation

[21] Appl. No.: 646,343
[22] PCT Filed: Nov. 16, 1994
[86] PCT No.: PCT/RU94/00256
§ 371 Date: May 15, 1996
§ 102(e) Date: May 15, 1996
[87] PCT Pub. No.: WO95/14346
PCT Pub. Date: May 25, 1995

[30] Foreign Application Priority Data

Nov. 16, 1993 [RU] Russian Federation ............. 93051495

[51] Int. Cl.$^6$ ................................. H04N 1/40; G06K 9/48
[52] U.S. Cl. .......................... 358/456; 382/199; 382/106
[58] Field of Search ..................................... 382/106, 108, 382/199, 201, 219–221, 252, 254, 258; 358/455–458, 465, 467, 534, 536

[56] References Cited

U.S. PATENT DOCUMENTS

| | | | |
|---|---|---|---|
| 4,675,831 | 6/1987 | Ito | 358/296 |
| 4,698,691 | 10/1987 | Suzuki | 358/283 |
| 5,034,990 | 7/1991 | Klees | 382/22 |
| 5,051,844 | 9/1991 | Sullivan | 358/456 |
| 5,229,867 | 7/1993 | Ershov et al. | 358/456 |

*Primary Examiner*—Thomas D. Lee
*Assistant Examiner*—Jerome Grant, II

[57] ABSTRACT

A method for adaptive screening of a continuous-tone original comprises ascertaining the presence or absence of a contour (1) in a given area (E) of an original. Where there is no contour (1) present, the elements of the corresponding substrate area are formed dark or light based on the result of a comparison of the optical-parameter value $M_E$ of the given substrate area of the original with the first weight values ($P_1$) of the elements, which ensure smooth tone rendition. Where a contour (1) present, the original area is estimated for relative busyness (q), the elements are assigned second weight values ($P_2$) which ensure geometrical contour-reproduction accuracy, and third weight values ($P_3$) are determined from the formula $P_3=qP_2+(q_{max}-q)P_1$. The elements are formed dark or light based on the result of a comparison of their third weight values with the optical-parameter value $M_E$. In another embodiment of the method, with a contour (1) being present in a given area (E), the following values are determined for this area: $M_1=M+q(M_{max}-M)$ and $M_2=M-q(M_{max}-M)$, where $M_{max}$ is the maximum value of the optical parameter. The substrate elements are formed dark or light based on the result of a comparison of their first weight values $P_1$ with the $M_1$ value and/or based on the result of a comparison of their second weight values $P_2$ with the $M_2$ value. A device for adaptive screening comprises a video signal source (2), sources (7 and 8) of weight values, an unit (10) for relative busyness estimation, and an unit (9) to control a beam chopper used for a beam to scan the elements of a substrate (5). In one of the embodiments, the beam chopper control unit (9) comprises several computing units (40) to match the number of elements within an area, said units being intended to form third weight values for elements, a switching unit (42), and a comparator (43). In a second embodiment, the beam chopper control unit (9) comprises a computing unit (48) to obtain the $M_1$ and $M_2$ signals, two switching units (49 and 50) to switch first and second weight values, respectively, two comparators (51 and 52) to compare first weight values with the $M_1$ value and second weight values with the $M_2$ signal, and an OR gate (53) to combine output signals from the comparators (51 and 52).

24 Claims, 11 Drawing Sheets

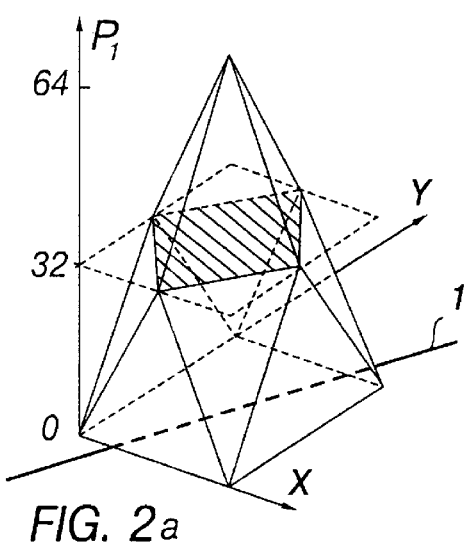
FIG. 2a
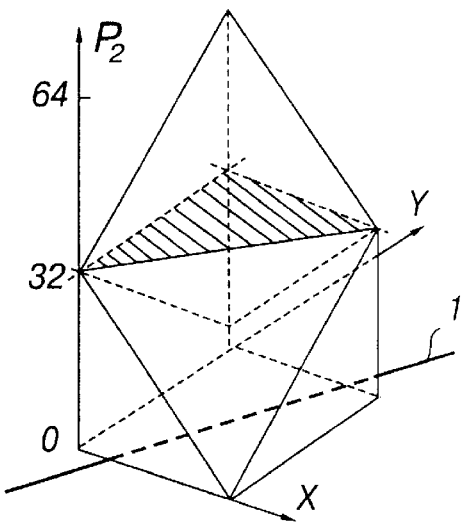
FIG. 3a
| 2  | 10 | 23 | 33 | 28 | 19 | 7  | 3  |
|----|----|----|----|----|----|----|----|
| 6  | 14 | 37 | 46 | 51 | 29 | 15 | 11 |
| 18 | 32 | 41 | 55 | 60 | 42 | 38 | 24 |
| 27 | 50 | 59 | 64 | 61 | 56 | 47 | 34 |
| 36 | 45 | 54 | 63 | 62 | 57 | 52 | 25 |
| 22 | 40 | 44 | 58 | 53 | 43 | 30 | 20 |
| 9  | 13 | 31 | 49 | 48 | 39 | 16 | 8  |
| 1  | 5  | 17 | 26 | 35 | 21 | 12 | 4  |
FIG. 2b
| 64 | 62 | 57 | 33 | 48 | 41 | 33 | 26 |
|----|----|----|----|----|----|----|----|
| 63 | 60 | 55 | 49 | 43 | 37 | 27 | 19 |
| 2  | 10 | 50 | 45 | 36 | 29 | 21 | 15 |
| 59 | 54 | 47 | 39 | 31 | 24 | 17 | 10 |
| 56 | 51 | 42 | 34 | 25 | 18 | 12 | 6  |
| 52 | 46 | 35 | 28 | 20 | 13 | 8  | 4  |
| 44 | 38 | 30 | 22 | 14 | 9  | 5  | 2  |
| 40 | 30 | 23 | 16 | 11 | 7  | 3  | 1  |
FIG. 3b
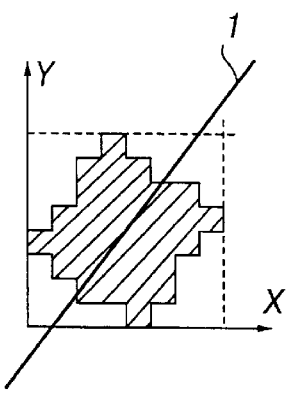
FIG. 2c
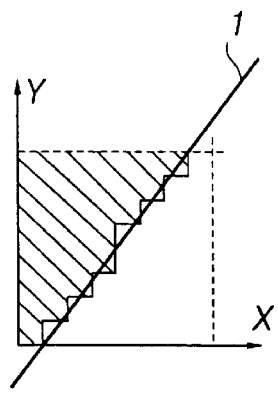
FIG. 3c

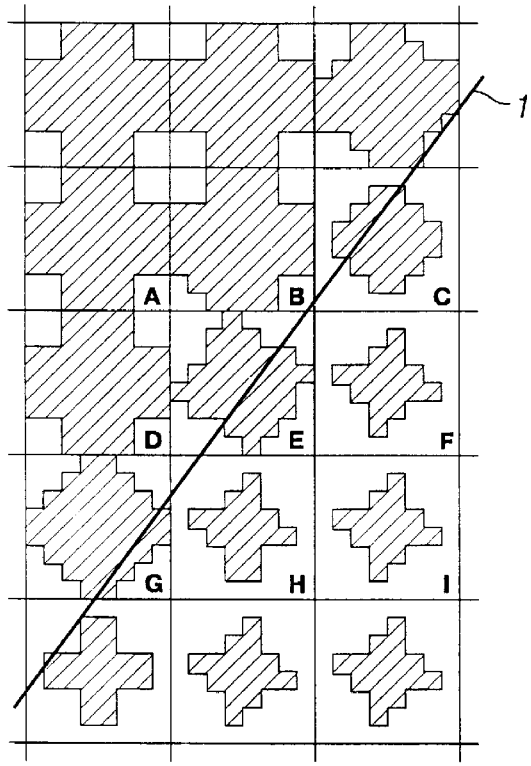
FIG. 7a
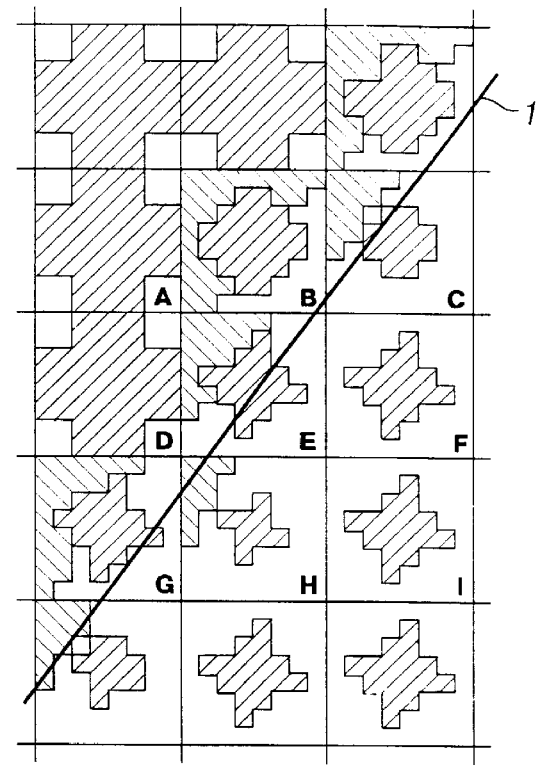
FIG. 7b
| 66 | 72 | 80 | 86 | 76 | 60 | 49 | 29 |
| --- | --- | --- | --- | --- | --- | --- | --- |
| 69 | 74 | 92 | 95 | 94 | 66 | 42 | 30 |
| 79 | 90 | 91 | 100 | 96 | 71 | 59 | 39 |
| 86 | 104 | 106 | 103 | 92 | 80 | 64 | 44 |
| 92 | 96 | 95 | 97 | 87 | 75 | 64 | 31 |
| 74 | 86 | 79 | 86 | 73 | 56 | 38 | 24 |
| 53 | 51 | 61 | 71 | 62 | 48 | 21 | 10 |
| 41 | 37 | 40 | 42 | 46 | 28 | 15 | 5 |
FIG. 6a
| 31 | 35 | 43 | 47 | 40 | 25 | 14 | 7 |
| --- | --- | --- | --- | --- | --- | --- | --- |
| 32 | 37 | 54 | 56 | 55 | 30 | 17 | 8 |
| 41 | 50 | 51 | 61 | 59 | 33 | 24 | 13 |
| 45 | 63 | 64 | 62 | 53 | 44 | 29 | 18 |
| 52 | 57 | 58 | 60 | 49 | 39 | 28 | 9 |
| 38 | 46 | 42 | 48 | 36 | 23 | 11 | 5 |
| 22 | 21 | 26 | 34 | 27 | 20 | 4 | 2 |
| 15 | 10 | 12 | 16 | 19 | 6 | 3 | 1 |
FIG. 6b

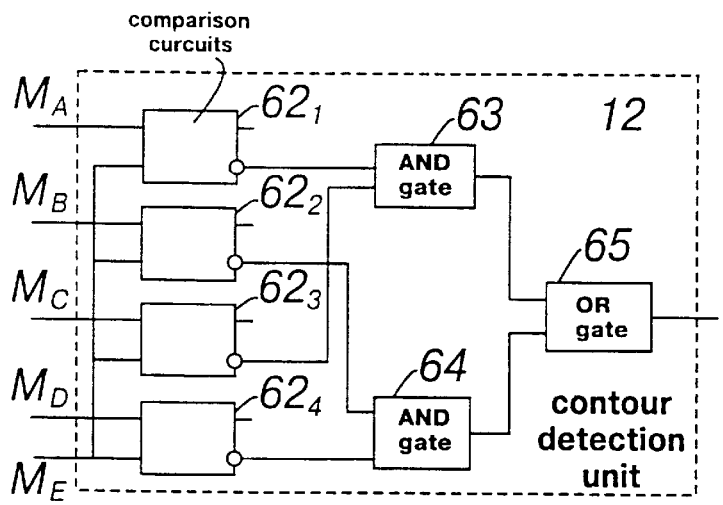
FIG. 17
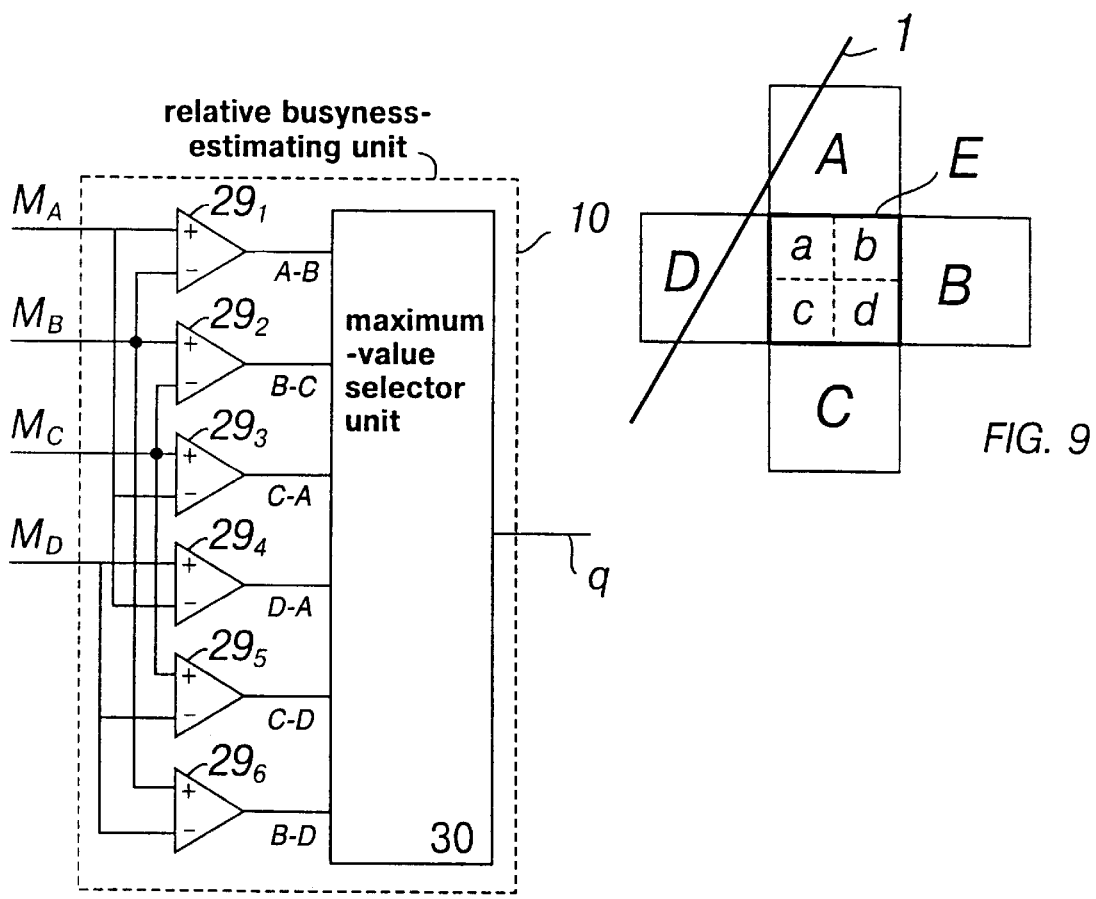
FIG. 10
FIG. 9

METHOD AND DEVICE FOR ADAPTIVE SCREENING OF CONTINUOUS TONE ORIGINALS

FIELD OF THE INVENTION

The present invention relates to graphic arts, facsimile and publishing technologies and, more specifically, to those image reproduction systems characterized by the possibility of providing merely two levels of optical parameter (such as optical density, brightness, reflection, absorption, transmission coefficients, etc.). The invention can be used in graphic arts scanners, in the input/output units of electronic graphic data processing systems, facsimile and copier equipment.

PRIOR ART

In graphic arts technology, in electrography, thermography, matrix and ink-jet printing, liquid crystal indicators, etc., use is made of the so called screening for tonal range reproduction. This consist in varying the relative surface areas taken up in a copy by printed elements (half-tone dots) and blank elements, i.e. by the dark and light elements. The minimum sizes of steadily reproducible half-tone dots and blanks have a finite value dependent on the noise level in a system, which level is in turn dependent on the properties of the substrate on which to reproduce the image, as well as on ink, plate, toner, etc. With due account taken of said finite sizes, the density of arrangement of half-tone dots on a substrate should not be excessively high because their relative surface areas should be free to vary within sufficiently large margins to thereby assure the desired number of gradations that can be reproduced. At the same time, insufficient screen frequency (screen ruling) will limit image definition and sharpness while the screen elements themselves will wreck the finer details and contours of an image.

To simultaneously satisfy the contradictory requirements for better definition and better tone rendition, an optimal screening principle may be employed, wherein screening will change its properties selectively, with due account taken of the nature of individual image areas, to meet on of said requirements to a greater or lesser extent (Yu. V. Kuznetsov and V. A. Uzilevski. Electronic Screening in Graphic Arts (Russ.). "Kniga", Moscow, 1976). As in a number of optimal coding solutions for continuous-tone (CT) images when transmitted through communication channels, the psycho-visual premise for an adaptive approach here lies in the well known relation between the contrast or threshold sensitivity of vision and the spatial frequency of a pattern.

There are known prior-art methods for adaptive screening (SU 832771, 1288934 and 1246408), wherein screen ruling is increased with increasing busyness in image areas, and tone rendition is assured not only by means on account of the half-tone dot size but also by increasing their number per unit image surface area. The incident decrease in the number of gradation reproducible in such areas is made up for by a noticeable increase in the brightness sensitivity threshold of vision with decreasing detail sizes. To assess the busyness of an area to be reproduced, the devices used to implement said methods comprise a video signal source with a main output, whose signal corresponds to the sampling value of the optical parameter of the area to be reproduced, and with supplementary outputs, whose signals correspond to the optical parameter values of the areas adjoining the one to be reproduced. Connected to the main and supplementary outputs of the source is a busyness analyzer to generate busyness signals based on the tonal values of the given and adjacent areas.

There are also known adaptive screening methods, wherein half-tone dots are formed of elements obtained by dividing a copy (substrate) area corresponding to the original area to be reproduced (U.S. Pat. Nos. 4,675,831 and 4,698,691). The half-tone dot shape is specified here for all gradations by a distribution matrix of weight values for the elements in one or several spatial periods of the screen. The dot size and the surface area printed within such a period are defined while forming the image based on the tonal value of the original area to be reproduced, and the position of printed and nonprinted elements is based on the result of the tonal value being compared with the weight values of the elements. In said adaptive screening methods, the density of half-tone dots arrangement is increased with increasing image busyness by way of selecting smaller-sized matrices out of a set of weight-value matrices. A set of weight-value sources is available with the devices designed to implement said methods.

The aforesaid adaptive screening methods of image synthesis presuppose that multilevel values of optical parameter of the original (video signal thereof) are made available for each of the elements of an area or for the half-tone dots, given the maximum density of arrangement of the latter. Increasing sample numbers will lead to increasing the video signal volumes, increasing times for video data exchange between the modules in a reproduction system, and increasing transmission times in remote reproduction, making it necessary to enhance the resolving power of a scanner and solving a series of other technological and operational problems.

There is known is a method for reproducing line images in systems characterized by a relatively coarse resolution of reading devices and a relatively high resolution of output devices (GB patents 159003 and 159004). This method uses a set of matrices with varying distribution of weight values for the elements of a substrate area, with the distribution of said values in each of the matrices being based on the condition of achieving the most accurate reproduction of the geometry of a contour presented in the original area in certain manner (e.g. horizontally, vertically, inclined, etc.). Based on the analysis of the optical parameter samples for those original areas adjoining the area to be reproduced on the substrate, the position of the contour in said area is defined, and an appropriate matrix selected, with the distribution of weight values such as to accord with said contour position. Next, the weight values derived from the matrix selected are compared with the sampling value of the optical parameter of the original area of interest, and an element is formed in the respective substrate area, dark when its weight value exceeds said sampling value, light if otherwise.

The device to implement said method, as taught in the same UK patents, comprises a weight-value source in the form of a ROM containing weight-value matrices, a video signal source with a main output, whose signal corresponds to the optical parameter value of an image area, of which the elements are formed in the respective substrate area, and with supplementary outputs, whose signals correspond to the optical parameters of the areas adjoining the area to be reproduced, and means for selecting weight-value matrices, connected to the main and supplementary outputs of the video signal source.

Said prior art methods and devices are disadvantageous in that there are a large number of matrices in a set and that they are difficult to identify on the basis of adjacent sample-value ratios, as well as in that it is not possible for graphically accurate contour rendition mode to gradually pass into a smooth tone rendition mode in the process of reproducing one original. As a general case, the various areas of the latter may correspond, in different measures, to the so-called line work (LW) and continuous-tone (CT) images and be gradually transformed one into another within the image field.

Simple mode switching in the process of reproducing the same illustration will lead to false patterns and noise in the image obtained. It is for this reason that such switching is used, e.g. in Dainippon Screen SG 111 scanner, for various types of illustration originals located individually in a pasted-up page layout only (GB 2139844).

There is known a method for adaptive screening of a CT original represented by multilevel samples of the optical parameter of the areas comprised therein and having a relatively low spatial frequency (U.S. Pat. No. 5,229,867). In this method, just as in those discussed hereinbefore, the substrate areas corresponding to the areas of the original and intended for reproduction of the image, are divided into elements which have a relatively high spatial frequency. Each element of a substrate area is assigned one of the weight values in accordance to with the orthogonal coordinates X and Y of this element within the area. The weight values are normalized according to a scale of multi-level optical-parameter samples and are specified in a manner such as to assure the smoothest tone rendition, with the distribution of weight values element-wise being identical for all substrate areas. While forming image on a substrate area, the weight value of each element is compared with the sampling value of the optical parameter of the original area corresponding to the substrate area to be formed. The element is formed light if its weight value differs from said sampling value on one side, and dark if its weight value differs from said sampling value in the other side.

In contrast to the methods according to U.S. Pat. Nos. 4,675,831 and 4,698,691, this method provides for higher contour rendition quality through displacement of the half-tone dots formed by dark elements in the areas crossed by a contour.

The dots are displaced towards the darker part of the image divided by the contour—increasingly so with increasing contour contrast—by way of correcting the weight value addresses as indicated by analysis of the ratio of the multi-level sampling values of the optical parameter of the original area corresponding to the substrate area to be formed and the adjacent original areas.

The device for adaptive screening of a CT original on to a substrate (U.S. Pat. No. 5,229,867) comprises the light source, a means for the beam from this light source to scan the elements of a substrate area, a light-source beam chopper, and a video signal source to form signals corresponding to the reflection coefficients, as the optical parameters, of the original areas. The video-signal source has a main output, whose signal characterizes the optical parameter of the original area corresponding to the substrate area containing the element exposed to the light-source beam, and several supplementary outputs whose signals characterize the reflection coefficients of the original areas adjoining the one, whose optical parameter is characterized by the signal at the main output of the video signal source.

The device also comprises synchronizing means, a source of weight values for elements of substrate areas, designed to ensure the desired tone rendition quality, an unit to form the coordinates for the elements of substrate areas, a beam chopper control unit, and element-coordinate correction units. The synchronizing means have their first output connected to the video signal source, the signal at this output having a frequency equal to the rate of displacement of substrate areas relative to light-source beam, while the second and the third outputs of the synchronizing means, with their respective signals having frequencies equal to the rates of displacement of elements relative to light-source beam along axis X and axis Y, respectively, are connected to the inputs of the coordinate-forming unit. This unit generates addresses to be used, with due corrections formed by the correction units, to derive weight values for elements from the weight-value source which has the form of a ROM. The beam chopper control unit is in the form of a comparator, whose inputs are connected to the output of the weight-value source and the main output of the video signal source, respectively. The comparator output is connected to the beam chopper input. The inputs of the element-address correction units purposed to assure displacement of half-tone dots subject to a contour being present in an area of an original, are connected in this device to the outputs of the video signal source.

Owing to this half-tone dots displacement capability, the method and device according to U.S. Pat. No. 5,229,867 assure better contour reproduction. Nevertheless, images obtainable with their use are still found to be blurred, being composed of discrete half-tone dots. At the same time, the relatively high spatial frequency of substrate area elements might allow of better contour rendition, considering that in the type of methods under discussion it is an order of magnitude higher than that of areas.

The unsatisfactory quality of contour reproduction characteristic of said method and device is associated with the half-tone dot size being dependent on the averaged value of the optical parameter of an area, e.g. on the reflection coefficient thereof. It is for this reason that for an area of an original, having an uniform grey tone, and for an area divided by contour and being half dark and half light, the half-tone dot size will be the same. The dot shape will like-wise be the same, because the distribution of the weight values for the elements in all the areas will be identical, being selected to achieve smooth tone rendition within zones where the tone changes but slowly and where the sensitivity threshold of vision is particularly small. Therefore, the half-tone dot or some part thereof, both composed of a multiplicity of elements, becomes the minimum spatial discrete unit to define the geometrical accuracy of reproduction of a contour or a finer detail, rather than an individual element, whose size ultimately determines the resolution of the output device or the printing process as a whole.

DISCLOSURE OF THE INVENTION

The present invention is based upon the objective providing a method and a device for adaptive screening of a original, such that would afford better use of the resolutions of the output devices and the printing process and assure high contour reproduction quality while retaining the smooth tone rendition and video signal processing volumes and times characteristic of the prior art methods.

The objective as stated above is achieved by providing, in accordance with the invention, two embodiments of a method for adaptive screening of a continuous tone original.

In the first embodiment of the proposed method for adaptive screening on to a substrate of a continuous-tone original represented by multi-level samples of the optical parameter of its areas of relatively low spatial frequency, comprising the steps of dividing the substrate areas into elements of relatively high spatial frequency, assigning each element of the substrate areas one of first weight values, all normalized in accordance with a multi-level sample scale and selected so as to achieve the desired smooth tone rendition, and forming each element of a given substrate area first- or second-toned depending on the sampling value of the optical parameter of the original area corresponding to said substrate area, in accordance with the invention, the presence or absence of a contour is ascertained in the original area corresponding to a given substrate area and, where no contour is present in said original area, each element of the given substrate area is formed first-toned if its first weight value exceeds the sampling value of the optical parameter of said original area and second-toned if its first weight value does not exceed the sampling value of the optical parameter of said original area while, with a contour being present in said original area, said area is estimated for relative busyness, each element of the given substrate area is assigned one of second weight values, all normalized in accordance with a multi-level sample scale and selected so as to achieve the desired geometrical accuracy of contour reproduction, a third weight value is obtained for each element of the given substrate area by adding up its second weight value multiplied by the relative busyness of the original area and its first weight value multiplied by the difference between unity and the relative busyness value followed by normalizing the result of addition in accordance with the multi-level sample scale, and each element of the given substrate area is formed first-toned if its third weight value exceeds the optical parameter value of the original area corresponding to said substrate area and second-toned if its third weight value does not exceed said sampling value.

In this embodiment of the proposed method, with a contour present in an area of the original, an element of the respective area of the substrate is formed based on the comparison of the optical parameter of the contour-containing original area with the third weight values of the elements, obtained from their first and second weight values, with due account taken of the relative busyness of said original area. A point to note is that the higher the busyness of the area, the greater the contribution to the third weight values of the second weight values used to assure accurate contour geometry reproduction, and the lesser the contribution of the first weight values used to assure smooth tone rendition. The picture is reversed when the contour-containing area has a relatively low busyness value: a greater contribution to the third weight values is due to the first weight values, a lesser contribution due to the second weight values. In this way both of the essential requirements for continuous-tone original screening—smooth tone rendition and accurate contour geometry reproduction—are satisfied.

The presence or absence of a contour in an area of an original can be ascertained by comparing the optical parameter value of said area with the sampling values of the optical parameters of areas adjoining it at right, left, top, and bottom, with a contour found to be present in said area if the sampling value of the optical parameter of said area is found to differ from the sampling values of the optical parameters of the areas adjoining it at right and left and/or from the sampling values of the optical parameters of the areas (B and H) adjoining it at top and bottom, and with no contour found being present in said area if the sampling value of the optical parameter of said area is found to be equal to at least one of the sampling values of the optical parameters of the areas adjoining it at right and left and to at least one of the sampling values of the optical parameters of the areas adjoining it at top and bottom.

The relative busyness of an area of an original may be determined as ratio of the maximum of the moduli of differences of the optical-parameter multi-level sample values for pairs of original areas adjoining said area to the maximum possible multi-level sample value of the optical parameter.

The relative busyness of an area of an original may also be determined by computing the moduli of differences of the optical-parameter sampling values for pairs of adjacent original areas including the one, whose relative busyness is to be determined, and at least those directly adjoining it, by multiplying each of the computed differences by a factor inversely related to the distance from the center of the area, whose relative busyness is to be determined, to the mid-segment connecting the centers of areas, of which the sampling values provide said difference, and inversely related to the number of said differences characterized by said distance, and by adding up the multiplication results obtained, with the ratio of the resulting total to its maximum possible value to be taken as the relative busyness value.

In the second embodiment of the proposed method for adaptive screening on to a substrate of a continuous tone original represented by multi-level samples of the optical parameter of its areas of relatively low spatial frequency, comprising the steps of dividing the substrate areas into elements of relatively high spatial frequency, assigning each element of the substrate areas one of first weight values, all normalized in accordance with a multi-level sample scale and selected so as to achieve the desired smooth tone rendition, and forming each element of a given substrate area first- or second-toned depending on the sampling value of the optical parameter of the original area corresponding to said substrate area, in accordance with the invention, the presence or absence of a contour is ascertained in the original area corresponding to a given substrate area and, where no contour is present in said original area, each element of the given substrate area is formed first-toned if its first weight value exceeds the sampling value of the optical parameter of said original area and second-toned if its first weight value does not exceed the sampling value of the optical parameter of said original area while, with a contour being present in said original area, said area is estimated for relative busyness, each element of the given substrate area is assigned one of second weight values, all normalized in accordance with a multi-level sample scale and selected so as to achieve the desired geometrical accuracy of contour reproduction, a first supplementary value $M_1=M+q(M_{max}-M)$ and a second supplementary value $M_2=M-q(M_{max}-M)$, where M is the sampling value of the optical parameter of said contour-containing original area, q is its relative busyness, and $M_{max}$ is the maximum possible multi-level sample value, are determined for said contour-containing original area, and each element of the given substrate area is formed first-toned if its first weight value exceeds the first supplementary value $M_1$ and/or if its second weight value exceeds the second supplementary value $M_2$ and second-toned if its first weight value does not exceed the first supplementary value $M_1$ and its second weight value does not exceed the second supplementary value $M_2$.

In this embodiment of the proposed method, just as in the one described above, the significance of second weight values, as far as the process of forming substrate elements dark or light is concerned, will increase with increasing busyness of contour-containing area while the significance of first weight values will decrease. And vice versa. Here, however, the significance of specific weight values is accounted for in a different way, viz through the use of the supplementary values $M_1$ and $M_2$ which are dependent upon the relative busyness value. As will be shown hereinafter in this specification, the greater the busyness of an original area, the greater number of elements that will be formed dark or light within the corresponding substrate area, based on the comparison of their second weight values with the $M_2$ value; the lesser the busyness level, the greater number of elements that will be formed dark or light based on the comparison of their first weight values with the $M_1$ value. In this way both of the essential requirements for continuous-tone original screening—smooth tone rendition and accurate contour geometry reproduction—are satisfied.

The presence or absence of a contour in an area of an original may be ascertained, and its relative busyness estimated, in the same manner as described hereinbefore for the first embodiment of the proposed method.

In the event of the first weight value of some one element of a given substrate area exceeding the first supplementary value $M_1$ as determined for the original area corresponding to the given substrate area, and the second weight value of said element exceeding the second supplementary value $M_2$ as determined for the original area corresponding to the given substrate area, it is convenient to decrease by unity the sampling value M of the optical parameter of said original area or else to increase by unity the first or the second weight values of all the elements of the given substrate area.

The objective as stated above is likewise achieved by providing two embodiments of a device for adaptive screening of a continuous-tone original.

In the first of said embodiments, the device for adaptive screening of a continuous-tone original on to a substrate, comprising a light source, a means for the beam from said light source to scan the elements of the substrate areas corresponding to the areas of the original to be screened, a light-source beam chopper, a video signal source with a main output, whose signal characterizes the optical parameter of the original area corresponding to the substrate area containing the element exposed to the beam from the light source, and with N supplementary outputs, whose signals characterize the optical parameters of at least those original areas adjoining the area, whose optical parameter is characterized by the signal at the main output of the video signal source, synchronizing means with a first output connected to the input of the video signal source and designed to form signals at a frequency equal to the rate of displacement of substrate areas relative to the light-source beam, a second output to form signals at a frequency equal to the rate of displacement of substrate elements relative to said beam in a first direction, and a third output to form signals at a frequency equal to the rate of displacement of substrate elements relative to said beam in a second direction normal to the first direction, a source of first weight values for the elements of substrate areas, designed to ensure the desired smooth tone rendition in the original screening process, and a beam chopper control unit connected to the video signal source and to the first weight-value source and comprising a comparator, of which the first input forms the first input of the beam chopper control unit and is connected to the main output of the video signal source while the output forms the output of the beam chopper control unit and is connected to the beam chopper unit, contains additionally, in accordance with the invention, a source of second weight values for the elements of substrate areas, designed to ensure the desired geometrical accuracy of contour reproduction in the original screening process, said source having its inputs connected to the respective outputs of the video signal source and having m outputs, where m is the number of elements in a substrate area, at which m outputs to form signals to characterize the second weight values for the respective elements of the given substrate area, and a unit to estimate the relative busyness of the original areas, having N inputs connected, respectively, to the supplementary outputs of the video signal source, with the first weight-value source having m outputs, at which to form signals to characterize the first weight values for the respective elements of a substrate area, and the beam chopper control unit containing additionally m computing units, each with a first input forming the second input of the beam chopper control unit, connected to the output of the relative busyness-estimating unit, a second input forming one of the m third inputs of the beam chopper control unit, connected to the respective one of the outputs of the first weight-value source, a third input forming one of the m fourth inputs of the beam chopper control unit and connected with that output of a second weight-value source, whose signal characterizes the second weight value of the element, of which the first weight value is characterized by a signal at the second input of said computing unit, and an output to form a signal $P'_3$ equal to $qP_2+(q_{max}-q)P_1$, where q is the signal at the first input of the computing unit, $P_2$ and $P_1$ are the signals at its third and second inputs, respectively, and $q_{max}$ is the maximum relative-busyness value, a scaling transformer with m inputs connected to the outputs of the respective computing units and m outputs, corresponding to said inputs, each to form a signal $P_3$ to characterize the third weight value of the respective element of the given substrate area, equal to $P'_3 M_{max}/P'_{3max}$, where $P'_3$ is the signal at the input of the scaling transformer, corresponding to a given output, $M_{max}$ is the maximum possible value of the video signal, and $P'_{3max}$ is the maximum signal of all at all the m inputs of the scaling transformer, and a switching unit with m data inputs connected to the respective outputs of the scaling transformer, two control inputs forming the two clock-pulse inputs of the beam chopper control unit and connected to the second and third outputs of the synchronizing means, respectively, and an output connected to the second input of the comparator, for connection to the second comparator input of that output of the scaling transformer, whose signal characterizes the third weight value of the element exposed to the beam of the light source.

This embodiment of the proposed device for adaptive screening is intended to realize the operations comprised in the first embodiment of the proposed method.

Each computing unit may comprise a first and a second multiply circuits, a subtract circuit to form a signal equal to the difference between the signal corresponding to the maximum relative busyness of an area of an original and the signal supplied to its input, and an adder, with the input of the subtract circuit connected with the first input of the first multiply circuit and forming a first input of the computing unit, the output of the subtract circuit connected to the first input of the second multiply circuit, the second input of which forms a second input of the computing unit, the second input of the first multiply circuit forming a third input of the computing unit, and the outputs of the first and second multiply circuits connected to the inputs of the adder, the output of which forms the output of the computing unit.

In the second embodiment, the device for adaptive screening of a continuous-tone original on to a substrate, comprising a light source, a means for the beam from said light source to scan the elements of the substrate areas corresponding to the areas of the original to be screened, a light-source beam chopper, a video signal source with a main output, whose signal characterizes the optical parameter of the original area corresponding to the substrate area containing the element exposed to the beam from the light source, and with N supplementary outputs, whose signals characterize the optical parameters of at least those original areas adjoining the area, whose optical parameter is characterized by the signal at the main output of the video signal source, synchronizing means with a first output connected to the input of the video signal source and designed to form signals at a frequency equal to the rate of displacement of substrate areas relative to the light-source beam, a second output to form signals at a frequency equal to the rate of displacement of substrate elements relative to said beam in a first direction, and a third output to form signals at a frequency equal to the rate of displacement of substrate elements relative to said beam in a second direction normal to the first direction, a source of first weight values, designed to ensure the desired smooth tone rendition in the original screening process, and a beam chopper control unit connected to the video signal source and to the first weight-value source and comprising a first comparator, contains additionally, in accordance with the invention, a source of second weight values for the elements of substrate areas, designed to ensure the desired geometrical accuracy of contour reproduction in the original screening process, said source having its inputs connected to the respective outputs of the video signal source and having m outputs, where m is the number of elements in a substrate area, at which m outputs to form signals to characterize the second weight values for the respective elements of the given substrate area, and a unit to estimate the relative busyness of the original areas, having N inputs connected, respectively, to the supplementary outputs of the video signal source, with the first weight-value source having m outputs, at which to form signals to characterize the first weight values of the respective elements of a substrate area, and the beam chopper control unit containing additionally a second comparator, a computing unit with a first input connected to the first input of the beam chopper control unit, connected with the main output of the video signal source, a second input forming a second input of the beam chopper control unit, connected to the output of the relative busyness-estimating unit, a first output connected to the first input of the first comparator, and a second output connected to the first input of the second comparator, the computing unit being capable of producing at its first output a signal $M_1$ equal to $M+q(M_{max}-M)$ and at its second output a signal $M_2$ equal to $M_{max}-q(M_{max}-q(M_{max}-M))$, where M is the signal at the first input of the computing unit, q is the signal at the second input of the computing unit, and $M_{max}$ is the maximum possible video signal value, a first switching unit with m data inputs forming m third inputs of the beam chopper control unit, connected to the respective outputs of the first weight-value source, two control inputs forming the clock-pulse inputs of the beam chopper control unit and connected, respectively, to the second and third outputs of the synchronizing means, and an output connected to the second input of the first comparator for connection to the second input of the first comparator of that output of the m outputs of the first weight-value source, whose signal characterizes the first weight value of the substrate element exposed to the beam of the light source, a second switching unit with m data inputs forming m fourth inputs of the beam chopper control unit, connected to the respective outputs of the second weight-value source, two control inputs connected to the respective two control inputs of the first switching unit, and an output connected to the second input of the second comparator for connection to the second input of the second comparator of that output of the m outputs of the second weight-value source, whose signal characterizes the second weight value of the substrate element exposed to the beam of the light source, and an OR gate, the two inputs of which are connected, respectively, to the outputs of the first and second comparators while the output forms an output of the beam chopper control unit, connected to the beam chopper input.

This embodiment of the proposed device is intended to realize the second embodiment of the proposed method.

It is convenient for the beam chopper control unit to additionally contain a subtract circuit connected between its first input and the first input of the computing unit, and an AND gate with its two inputs connected with the outputs of the first and second comparators, respectively, for the first input of the beam chopper control unit to be connected to the first input of the subtract circuit, and for the output of the AND gate to be connected to the second input of the subtract circuit.

As an alternative, it may be convenient for the beam chopper control unit to additionally contain an adder connected between the output of the first or second switching unit and the second input of, respectively, the first or second comparator, and an AND gate with its two inputs connected, respectively, with the outputs of the first and second comparators, for the first input of an adder to be connected to the output of the first or second switching unit, and for the second input of the adder to be connected to the output of the AND gate.

The computing unit may contain a first and a second subtract circuits, a multiply circuit, a maximum video-signal value source, and an adder, with the first input of the first subtract circuit forming the first input of the computing unit and being connected with the first input of the adder, the second input of the first subtract circuit being connected with the output of the maximum video-signal value source and with the first input of the second subtract circuit, the output of the first subtract circuit being connected with the first input of the multiply circuit, of which the second input forms the second input of the computing unit and the output is connected to the second input of the adder and to the second input of the second subtract circuit, the output of the adder being the first output of the computing unit, and the output of the second subtract circuit being the second output of the computing unit.

The two aforesaid embodiments of the proposed device may have the following features in common.

The device for adaptive screening of a continuous-tone original may contain a contour detection unit to form a signal corresponding to the presence of a contour in an area of an original, whose optical parameter is characterized by the signal at the main output of the video signal source, and a gating circuit connected between the output of the relative busyness-estimating unit and the second input of the beam chopper control unit, with the contour detection unit having a main input connected to the main output of the video signal source and a group of supplementary inputs connected to at least some of the supplementary outputs of the video signal source, and an output connected to the control input of the gating circuit for connection of the output of the relative busyness-estimating unit to the second input of the beam chopper control unit when there is a signal present at the output of the contour detection unit to indicate the presence of a contour, and for disconnection of the output of the relative busyness-estimating unit from the second input of the beam chopper control unit when there is no such signal at the output of the contour detection unit.

In this arrangement, the group of supplementary inputs of the contour detection unit may include a first, a second, a third, and a fourth inputs connected, respectively, with those four of the N supplementary outputs of the video signal source, whose signals characterize the optical parameters of those original areas adjoining, respectively, at top, right, bottom, and left the area, whose optical parameter is characterized by a signal at the main output of the video signal source, while the contour detection unit may contain four comparison circuits, each capable of forming a signal at its output in case of its input signals being unequal, two AND gates, and an OR gate, with the main input of the contour detection unit being formed by the interconnected first inputs of the comparison circuits, the first, second, third, and fourth inputs of the contour detection unit being formed by the second inputs of, respectively, the first, second, third, and fourth comparison circuits, the outputs of the first and third comparison circuits being connected, respectively, with the two inputs of the first AND gate, the outputs of the second and fourth comparison circuits being connected, respectively, with the two inputs of the second AND gate, and the outputs of the AND gates being connected, respectively, with the two inputs of the OR gate, whose output forms that of the contour detection unit.

The relative busyness-estimating unit may contain several subtract circuits, the number n of which will be equal to the number of binary combinations of the N inputs of said unit, with the inputs of each connected to the respective two first inputs of the relative busyness-estimating unit, which form one of said combinations, and a maximum-value selector unit, each of the n inputs of which is connected to the output of the respective subtract circuit and the output signal of which is one of its input signals, the maximum in absolute value, divided by the maximum possible video-signal value, the output of the selector unit being that of the relative busyness-estimating unit.

As an alternative, the relative busyness-estimating unit may have still another input connected with the main output of the video signal source, and contain at least two groups of subtract circuits, each having its inputs connected to the respective two inputs of the relative busyness-estimating unit, whose signals will characterize the optical parameters of a pair of adjacent original areas, with each group comprising subtract circuits, whose input signals will characterize the optical parameters of such pairs of adjacent original areas that have the same distance r from the mid-segments connecting the centers of the areas forming said pairs to the center of the area, whose optical parameter is characterized by the signal at the main output of the video signal source, first adders equal in number to the groups of subtract circuits and each having its inputs connected to the outputs of the subtract circuits of the relevant group for adding up the absolute signal values at the adder inputs, scaling transformers equal in number to the first adders and each having its input connected to the output of the respective first adder for multiplying the output signal of the first adder by a value inversely related to the respective distance r and to the number of subtract circuits in the respective group, and a second adder with its inputs connected with the outputs of the scaling transformers for forming a signal equal to the sum of its input signals, divided by the maximum possible value of said sum, the output of the second adder being that of the relative busyness-estimating unit.

Selection of the first or the second embodiments of the proposed method and device depends upon the specific textural features of an image to be reproduced, as well as upon the capabilities of hard- and software available.

The invention is hereinafter made more fully apparent through a detailed description of examples of its embodiment, with due references to the accompanying drawings.

SUMMARY OF THE DRAWINGS

FIG. 2a, 2b and 2c illustrate an example of distribution of prespecified first weight values for elements within a substrate area and a half-tone dot corresponding to an original area having a multi-level sample value of 32;

FIG. 3a, 3b and 3c illustrate an example of distribution of second weight values for the elements of a substrate area and the arrangement of dark and light elements in a substrate area corresponding to an original area crossed by a contour of maximum sharpness and having a multi-level sample value of 32;

FIG. 6a and 6b illustrate the distribution of third weight values over elements and the arrangement of dark and light elements in a substrate area corresponding to an original area with the optical parameter distribution as shown in FIG. 4b;

FIG. 7a and 7b show a fragment of an image with a contour of intermediate contrast, obtained by the prior-art and proposed methods, respectively;

FIG. 9 illustrates an example of dividing an image into areas and the middle area into elements, said example being used for the description of the structure and operation of the device as represented in FIG. 8;

FIG. 10 and 11 are embodiments of the relative busyness-estimation unit in the device as shown in FIG. 8;

FIG. 17 illustrates the contour detection unit in the device as shown in FIG. 8.

PREFERRED EMBODIMENTS OF THE INVENTION

Figure 1:
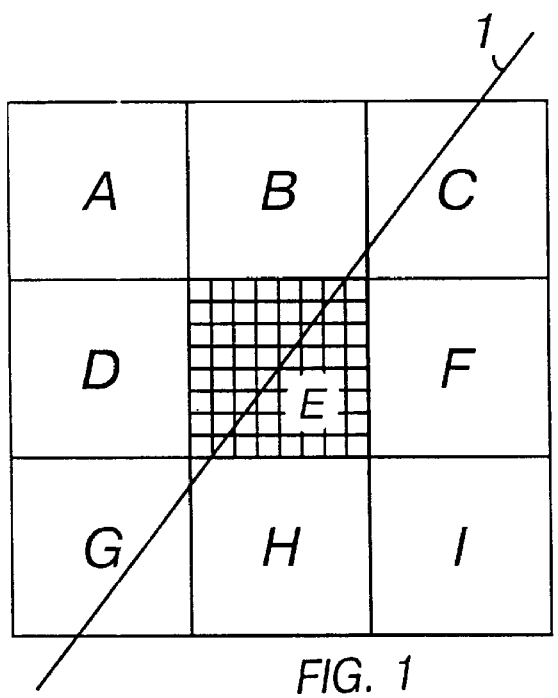
FIG. 1 illustrate schematically the division of an original and a substrate into areas, and one of the substrate areas into elements.

The method for adaptive screening of a continuous-tone original, according to the invention, consist in the original of an image being divided into areas of, e.g., square form and arranged in the orthogonal grid. The substrate on which to obtain a copy of the image is likewise divided into the same number of areas of the same form and in the same order so that each substrate area has a certain original area corresponding to it. Nine such adjacent areas, A,B,C . . . I, which may be regarded both as an original areas and as substrate areas, are shown on FIG. 1. These substrate and original areas are comparatively large, i.e. they have a relatively low spatial frequency. Substrate areas are subdivided, in their turn, into smaller areas hereinafter referred to as elements, and these have a high spatial frequency, compared to areas. As an example, FIG. 1 illustrates the subdivision of the central area E of the total of nine areas (substrate areas being implied) into 64 elements, although, as a general case, the number of elements may be greater or smaller than 64. A halftone image is produced on a substrate by forming each of the elements first- or second-toned, i.e. dark or light.

For each of the original areas, there is determined a multi-level value of an optical parameter which may be reflection coefficient, absorption coefficient, transmission coefficient, optical density, etc.

A scale of optical-parameter sample levels may be continuous and represented by an analog electric signal, or it may be discrete, with digital representation of video signals. In the latter case, the number of discrete levels in a scale may be 64, 128 or 256, with encoding by six, seven or eight binary digits. For the example below, a scale of 64 quantization levels is adopted, i.e. samples may have values of 1 through 64. If the sampling value (quantization level) is proportional to the optical parameter averaged for the sampling zone (original area), this value is taken to be equal to the number of elements to be first-toned in the relevant substrate area while the number of elements to be second-toned in the same area will be equal 64 minus the number of elements to be first-toned. For the example under discussion, reflection coefficient is taken as the optical parameter, of which the multi-level samples are used to represent the continuous-tone original to be screened. With this optical parameter, in the case of a positive half-tone image to be formed, the number of substrate-area elements to be formed light will be equal to the sampling value for the original area corresponding to the given substrate area while the number of dark elements will be equal to the difference between 64 and the sampling value for said original area. Thus, if the sampling value is 16, then 16 elements in the substrate area are to be formed light, with the remaining 48 elements in the same area to be formed dark. The relative coverage by the dark elements in this case will be 75%.

As a general case, the size of the quantization scale and the number of elements obtained by subdividing substrate areas may not necessarily coincide. Besides, even if reflection coefficient is used as an optical parameter, the dependence of the number of area elements to be formed dark or light upon the multi-level sample value of the optical parameter of the respective original area may be found to be nonlinear due to the specific aspects of interaction between ink and substrate material. In any case, however, the number of elements is definitively related to the multi-level sample of the optical parameter of the respective original area.

In order to find out which of the elements in a substrate area are be formed light, which ones dark use is made of the so-called weight values.

Each element in a substrate area is assigned one of the pre-specified weight values, the distribution of which within an area is identical for all of the areas and is based on the condition of assuring continuous rendition of the maximum number of gradations present in original. The weight values for elements are defined by their orthogonal coordinates X and Y and are identical for all areas. Said weight values hereinafter referred to as first weight values, may, e.g., monotonously decrease from the center of an area to its periphery. A three-dimensional model of such distribution of first weight values $P_1$ over the elements of an area, having coordinates X and Y, and a matrix of numbers forming the first weight values for the 8×8 elements of the area, are shown in FIG. 2a and FIG. 2b respectively. Note that the weight values are normalized in accordance with the multi-level sampling scale, ranging from 1 to 64 if the encoding adopted for optical-parameter samples is six binary digits.

The obtainment of weight values with a similar distribution over elements is described, e.g., in the method according to U.S. Pat. No. 5,229,867.

Where there is no contour in the original area corresponding to the substrate area to be formed, the first weight value of each element is compared with the sampling value of the optical parameter of said original area. (The operations associated with ascertaining the presence or absence of a contour will be described below). If the first weight value of an element exceeds the multi-level sample value of the reflection coefficient of the original area corresponding to the substrate area containing said element, said element is formed dark; if otherwise, it is formed light. If the distribution of first weight values over the elements of an area conforms to what is shown in FIG. 2a and FIG. 2b, then the dark elements will form on the substrate area the so-called half-tone dots, whose size will be dependent on the tonal value of the respective original area. FIG. 2c shows, by way of example, a half-tone dot with the relative size of 50%, the dot having been formed based on a sampling value of 32. The elements formed dark in this case are all those, whose first weight values are over 32. The formation of elements for a given substrate area complete, other substrate areas are taken up, using the same distribution of first weight values but in conjunction with the sampling values corresponding to these other areas, with the sample "window" formed by, e.g., nine areas as shown on FIG. 1, being shifted at a pitch multiple of the area size.

The sampling value for each area is obtained by averaging the reflection coefficient for the area in the process of analyzing the original electrooptically. This kind of averaging causes the low spatial frequencies of the image to be filtered. As a result, the sampling value turns out to be the same for a single-toned area with reflection coefficient of 0,5 and for an area crossed by a contour 1 (FIG. 1) demarcating the light and dark fields of the original, both having limiting reflection coefficient values. Thus, should only the first weight values, selected for the best possible tone rendition, be used for an image formation on a substrate, a half-tone dot would wreck the contour. As may be seen from FIG. 2c, a substantial portion of the dot is found on that side of the substrate area which corresponds to the light field of the original.

Shifting half-tone dots towards the darker zone, as taught in U.S. Pat. No. 5,229,867, makes for somewhat better contour reproduction quality. Nevertheless, in this case also the contour is blurred, because the dark elements in each area are concentrated in the form of half-tone dots so that some portion of a half-tone dot is found in the light zone of the image while some part of the light elements surrounding the dot, which should be the light zone, are found in the dark zone.

To enhance the geometric accuracy of a image contour reproduction, the invention provides for ascertaining the presence of a contour is in the area of the original, corresponding to the substrate area being formed at the time, thus in area E. To this end, the sample $M_e$ of area E is compared with the samples of each of areas D, F, B and H adjoining area E at left, right, top and bottom, respectively. A contour is considered to be present in area E if the sample $M_e$ of said area differs on either side from the samples $M_d$ and $M_f$ of areas D and F adjoining area E at left and at right and/or from the samples $M_b$ and $M_h$ of areas B and H adjoining area E at top and at bottom, i.e. one or both of the following conditions is or are met:

$$M_d \neq M_e \neq M_f, \quad M_b \neq M_e \neq M_h \tag{1}$$

FIG. 1 shows a single contour 1 crossing area E, which contour makes a line of demarcation separating the darker part of the image formed, e.g., by areas D, A, and B and left-hand parts of areas C, E, and G, from the lighter part of the image formed by areas H, I, and F and right-hand parts of areas C, E, and G. For this case, when contour 1 crosses area E from its lower left corner to its upper right corner, the sample $M_e$ of the optical parameter of area E differs from any of the samples $M_d$, $M_f$, $M_b$ and $M_h$ of the optical parameter of areas D, F, B, and H respectively, $M_e$ being smaller than $M_f$ and $M_h$ but greater than $M_d$ and $M_b$. However, with the contour in the area positioned differently, the sample ratio may be different. Thus, with the contour crossing areas D,E, and F horizontally, the sample $M_e$ of area E will be equal to the samples $M_d$ and $M_f$ of areas D and F and will differ from the sample $M_b$ of area B on one side and from the sample $M_h$ of area H on the other side.

There are other, more complicated, methods that may be used to detect a contour or contours, e.g., as taught in SU 1,190,537.

On detecting a contour in the original area corresponding to the substrate area to be formed, each element of this area is assigned additionally one of the weight values hereinafter referred to as second weight values and specified so as to ensure accurate contour geometry reproduction in the image to be formed. In contrast to the first weight values, the distribution of second weight values over the elements within an area may vary from area to area and is dependent on the position of the contour in the area (thus, a rectilinear contour may have a horizontal or vertical position or one inclined to one side or the other). In other words, the distribution of second weight values over the elements of a substrate area corresponding to a contour-containing original area, is dependent upon the sampling values of the optical parameter of the areas adjoining the contour-containing area. Thus, if the reflection coefficient sample for a given area of an original is greater than that for the area adjoining the given area at the left and smaller than that for the area adjoining the given area at the right, then the elements in the right-hand portion of the respective substrate area will have higher second weight values than those in the left-hand portion of the area. The use of such a weight values for image reproduction is described, e.g., in GB 1,595,004. Just as first weight values, second weight values are to be normalized in accordance with a scale of multi-level optical-parameter samples.

The distribution of second weight values $P_2$ over the elements of the substrate area corresponding to area E of FIG. 1, crossed by the contour one in a manner such that left of the contour is the dark zone of the image, with the minimum value of reflection coefficient, while right of the contour is the light zone, with maximum value of reflection coefficient, is given in FIG. 3a in the form of a three-dimensional model, and in FIG. 3b in the form of a matrix of numbers to be assigned one to each element in the area.

In this case, when the contour is one of maximum contrast, demarcating zones, of which one has the maximum, and the other the minimum value of optical parameter, the image is considered to be line-work (two-levelled), and there is practically no longer any need for the first weight values as described above. The multi-level sample value of the contour-containing original area is compared with the second weight values of the elements of respective substrate area, and those elements with their weight values exceeding the sample value are formed dark while those elements with their weight values not exceeding the sample value are formed light. In the example under discussion, when the area E of the original is half in the light field, half in the dark field, the reflection coefficient value of said area is equal to 32, and the elements of the substrate area, which are formed dark, are those, whose weight values are greater than 32. In this case, as shown in FIG. 3c, the contour reproduction is the most accurate, with the resolutions of the output unit of the graphic arts scanner and plate making and printing processes, amounting to e.g., 100 lines per mm, fully utilized.

Thus, the above methods for obtaining copies based on the use of solely first weight values and on the use of solely second weight values, are each, taken separately, capable of best meeting the faithful tone rendition requirement in the first case and the requirement for geometrical accuracy of contour and fine detail reproduction in the latter case.

Figure 4A:
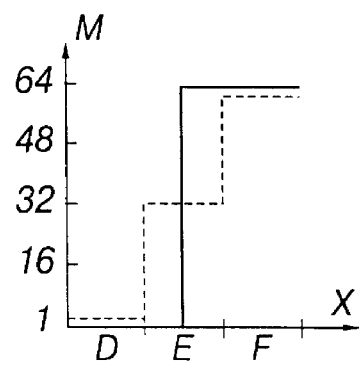
FIG. 4a, 4b and 4c illustrate examples of optical parameter distribution over original areas.
Figure 4B:
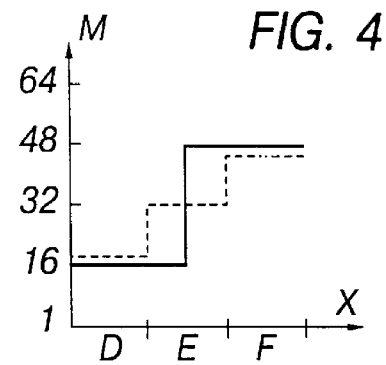
Figure 4C:
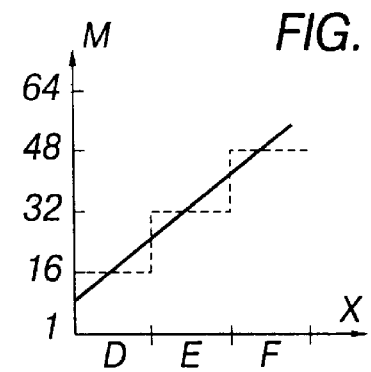

However, in a real continuous-tone original, the very variegated contours are to be encountered. Examples of distribution horizontally across areas D, E, and F of reflection coefficient values expressed as M numbers of quantization levels, for contours of varied character and having the same direction as contour 1 in FIG. 1, are shown in FIG. 4 by solid lines. The dashed lines here correspond to the sampling values of reflection coefficient, averaged for the areas of the original in the process of electrooptical analysis thereof. The distribution in FIG. 4a corresponds to a sharp contour of maximum contrast. In real continuous-tone originals, there is an abundance of sharp but weaker contours to be encountered (FIG. 4b), such contours making a sharp boundary line between two zones with reflection coefficients differing to a lesser extent, as well as of contours of maximum contrast but with the transition zone between the light and dark parts more or less blurred (FIG. 4c). Besides, in many cases, the contrast and the degree of blurring will vary gradually along the contour. For these reasons, image forming if based only on the use of second weight values, always assuring the ultimate sharpness and contrast of a contour in a copy, will make a reproduction unfaithful. Abrupt changing from the element-forming mode based on the use of second weight values to the forming mode based on the use of first weight values when passing over to the nearest area with no contour therein, may result in a noticeable level of noise in the image owing to a sudden change in the geometry of the areas being formed.

In order that in reproducing an image featuring contours of diverse character both the smooth tone rendition requirement and the contour geometry reproduction accuracy requirement might be satisfied, the present invention provides for using such a parameter as relative image busyness. The busyness of an image zone is understood to denote a cumulative parameter characterizing the contrast and number of contours in said zone. The greater the contrast of contours and their number in an image area, the greater is the busyness of said area, and vice versa. The relative busyness of an image is the ratio of the actual busyness value to the maximum possible busyness value. This latter value may be determined, e.g., experimentally, with due account taken of the contrast, size, and density of arrangement of image details, the accuracy of reproduction of which it is proposed to be enhance through the use of the inventive method.

The relative busyness of an original image area may be defined as the ratio of a maximum of the moduli of differences of the optical-parameter samples for the pairs of areas adjoining the given area to the maximum possible sample value $M_{max}$(equal to 64 in the example under discussion) which may be assumed, in this case, to be the maximum possible busyness value, being close to the maximum possible (63) difference of the optical-parameter sample values.

In an example under discussion, while estimating the relative busyness of area E crossed by the contour 1, the maximum differences are yielded by the optical-parameter samples of the following pairs of areas positioned on different sides of area E and uncrossed by the contour 1: D and F, A and I, D and I, A and F. If the contour 1 has the maximum contrast and sharpness here (in accordance with FIG. 4a), then the sample $M_D$ of area D is equal to 1, the sample $M_F$ of area F is equal to 64, and the relative busyness q of area E is equal to $M_D - M_F/M_{max} = 63/64 \approx 1$. For an area with a contour of a maximum sharpness and medium contrast (FIG. 4b) and for an area with a blurred contour of maximum contrast (FIG. 4c), the maximum sample difference for e.g., areas D and F is equal to 32, and the relative busyness q of area F is equal to $32/64 = 0{,}5$.

More precisely the relative busyness of an original area, e.g. area E, is determined by computing sample differences for adjacent areas including area E and at least areas A, B, C, D, F, G, H, and I, directly adjacent to area E and forming a sample "window" (FIG. 1). If the "window" includes other neighboring areas (not shown on FIG. 1), apart from those mentioned above, then, with a view to higher busyness determination reliability, the computation may also use the differences covering said additional areas. Then the absolute values of differences obtained are added up, after first multiplying each by a factor k inversely related to the distance r (FIG. 5) from the center of area E to the mid-segment connecting the centers of areas, of which the samples provide the given difference. Since with increasing distance from the central area E the number of pairs of neighboring areas equidistant therefrom increases, the factor k is likewise inversely related to the number of equidistant pairs, i.e. those pairs of adjacent areas characterized by the same value of r.

Figure 5:
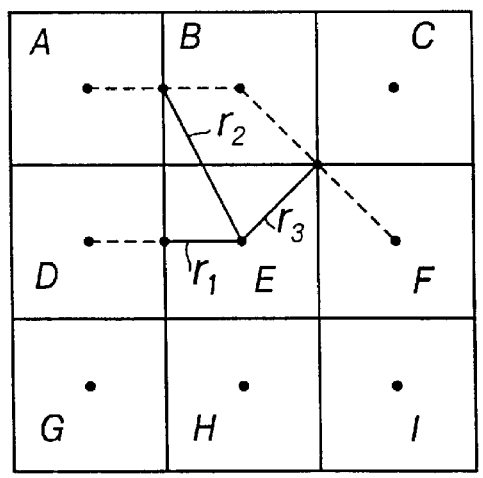
FIG. 5 elucidates the operation of estimating the busyness of an image, according to one of the embodiments of the invention.

As may be seen from FIG. 5, the sample differences of all possible pairs formed by adjacent original areas within the sample window, may be divided into three groups, each with its own factor, $k_1$, $k_2$, and $k_3$ dependent upon the value of said distance r for the respective group and the number of differences in the group. The first group includes the following four pairs of areas: E and B, E and D, E and F, and E and H. The segments connecting the area centers in each of said pairs are at the minimum distance $r = r_1$ from the center of area E, whose relative busyness is to be estimated. The second group of differences is formed by pairs of areas having adjacent corners: E and A, E and C, E and I, E and G, D and B, etc. For these pairs, $r = r_2 = \sqrt{2} r_1$. The third group includes pairs of areas—A and B, B and C, C and F, etc.—for which $r = r_3 = \sqrt{5} r_1$. Thus the relative busyness q of area E in FIG. 1 may be expressed as $$q = \qquad (2)$$

$$1/Q_{max}[k_1(|M_E - M_B| + |M_E - M_D| + |M_E - M_F| +$$

$$|M_E - M_H|) + k_2(|M_E - M_A| + |M_E - M_C| + |M_E - M_I| +$$

$$|M_E - M_G| + |M_D - M_B| + |M_B - M_F| + |M_F - M_H| +$$

-continued
$$|M_H - M_D|) + k_3(|M_A - M_B| + |M_B - M_C| +$$

$$|M_C - M_F| + |M_F - M_I| + |M_I - M_H| + |M_H - M_G| +$$

$$|M_G - M_D| + |M_D - M_A|)],$$

where $Q_{max}$ is the maximum possible value of the sum enclosed in this expression in square brackets. This maximum sum value may be obtained, for instance, by estimating a test pattern containing within the area to be reproduced and those adjacent to it a certain number of lines of full contrast, whose density of arrangement should not exceed the spatial frequency of elements in a substrate and may be reproduced in the screening process. It will be noted that relative busyness values q for any image area ranges from 0 to 1. The zero busyness value will betoken no contour while the unity busyness value will characterize areas that may contain, for example, a contour of maximum contrast and maximum sharpness.

Assuming the factors $k_1$, $k_2$, and $k_3$ to be inversely proportional to the distances $r_1$, $r_2$, and $r_3$, respectively, $r_1$ to be equal to unity, and the number of area pairs in each of the second and third groups to be twice as many as in the first group, then $k_1 = \frac{1}{2}\sqrt{2}$, $k_3 = \frac{1}{2}\sqrt{5}$. In the example under discussion, that part of expression (2) enclosed in square brackets may be assumed as the maximum busyness value $Q_{max}$ for an area crossed by a contour 1 of maximum contrast, as shown FIG. 1 and FIG. 4a. For this contour, $M_D = M_A = 1$, $M_B = 2$, $M_C = 45$, $M_F = M_I = 64$, $M_E = 32$, $M_H = 63$, $M_G = 19$ and $Q_{max} = 228$. For a contour of half the contrast, as shown in FIG. 1 and FIG. 4b, $M_D = M_A = 16$, $M_B = 17$, $M_C = 40$, $M_F = M_I = 48$, $M_E = 32$, $M_H 47$, $M_G = 24$ and $q = 116/Q_{max} = 0{,}5$.

The maximum value of the sum enclosed in expression (2) in square brackets, may be greater than 228 if, for example, area E is crossed not by a single contour 1, as shown on FIG. 1, but by two contours: by dark band against a light background or a light band against a dark background, with two borders, each corresponding to the dark tone changing to the light tone or vice versa. If the object is to reproduce on a substrate not only single contours but also such bands as above, then another value, consistent with said object, may be taken as $Q_{max}$, i.e. the sum value in square brackets in expression (2) computed for a corresponding test pattern.

The busyness of an image may also be estimated from the power of the spectral components in the high spatial frequency region of the image. To this end, the proposed method may use the fast Fourier transform for the sampling values of the given and neighboring areas of the image, as taught, for instance, in GB 2,139,844.

Next, based on the value obtained for the relative busyness of an original area, the multi-level sample value of said area, and the weight value for the elements of a substrate, it must be determined which tone, light or dark, to use in forming each specific element, relying on the first or the second embodiment of the proposed method as described hereinafter.

According to the first embodiment, there is determined for each element of the substrate area being formed a third weight value $P_3$ based on its first and second weight values, $P_1$ and $P_2$, respectively, and the relative busyness q of the corresponding original area. More specifically, the third weight value for an element is obtained by adding up its second weight value $P_2$ multiplied by the relative busyness value q and its first weight value $P_1$ multiplied by the difference between unity and the relative busyness q. The result is unnormalized third weight value $P'_3 = qP_2 + (1 - q)P_1$, which is then normalized in accordance with the multi-level sampling scale to give a normalized third weight value $P_3$. In the example under discussion, re. FIG. 4b, the relative busyness value q of area E crossed by the contour 1, is equal to 0.5 so that to give third weight values the first and second weight values are added up multiplied by the same value (a factor of 0.5). For this reason, as well as because of the normalizing step to follow, the factor of 0,5 common for the two summands, is not accounted for in FIG. 6 where unnormalized third weight values are given for the elements of the substrate area corresponding to the area E of the original, for the case under consideration, and, for the sake of simplicity, the third weight value for each element is represented by the sum of its first and second weight values as shown in FIG. 2b and FIG. 3b, respectively. Third weight values normalized in accordance with a scale of 64 multi-level sample values are given in FIG. 6b.

Normalizing is performed by dividing an unnormalized value by the maximum unnormalized value and multiplying by 64. Thus, for the upper left element in FIGS. 2b, 3b, 6a, and 6b, the unnormalized third weight value of 66 was obtained as the sum of its first weight value 2 (FIG. 2b) and its second weight value 64 (FIG. 3b). In FIG. 6a, the largest unnormalized third weight value is 106. The normalized third weight value for said element is 66×64/106=31, as shown on FIG. 6b.

On normalizing the third weight values for the elements of the substrate being formed, the third weight value of each element is compared with the multi-level sample value of the reflection coefficient of the respective area of the original. If the third weight value exceeds the sample value, the element is formed dark; if not the element is formed light. In the example under discussion, the sample value for area E is 32, so the elements to be formed dark are those, whose third weight values exceed 32. In FIG. 6b, such elements are picked out by a thick solid line.

As may be seen from FIG. 6b, the accuracy of contour geometry reproduction here is intermediate, compared to the reproduction according to FIG. 2c and FIG. 3c.

The zone filled in by dark elements is shifted in FIG. 6b towards the darker part of the image and extended along the contour 1 in contrast to the zone formed by dark elements in FIG. 2c where it is located in the center of the area. At the same time, some of the elements left of the contour 1 in FIG. 6b remain light, and some of the elements right of the contour 1 remain dark, which is indicative of the medium brightness of the original left and right of the medium-contrast contour and which is unobtainable when reproducing an image with the use of second weight values only, as shown in FIG. 3b.

Combining first and second weight values, as described above, for the purpose of obtaining third weight values, will sometimes lead to the change in reflection coefficient in the region of a contour, reflected in second weight values, being somewhat smoothed out. Thus, in the example discussed, four elements are given the same unnormalized of 86, as shown in FIG. 6b. On normalizing, said four elements are assigned third weight values of 45,46,47, and 48, different from one another and close to the computed value, the distribution of said third weight values between said elements being arbitrary. The number of such elements may be greater in those cases when the first and second weight values within an area increase or decrease in opposite directions. In this case, the third weight value-matrix is transformed into so-called dither matrix with irregular distribution of values, failing to reflect the true optical parameter distribution in the original.

There will be no such problem, should the second embodiment of the proposed method be used. According to this embodiment, two supplementary values $M_1$ and $M_2$ are computed for an original area, based on the relative busyness values q and multi-level sample M of said area corresponding to the substrate area to be formed, in accordance with the following expressions:

$$M_1=M+q(M_{max}-M) M_2=M-q(M_{max}-M), \qquad (3)$$

where $M_{max}$ is maximum possible sampling value equal, in the case under consideration, to 64. Then the first weight value of each element of the area being formed, is compared with the $M_1$ value, and the second weight value of said element with the $M_2$ value. The element is formed dark if its first weight value exceeds the $M_1$ and/or its second weight value exceeds the $M_2$ value. If the first weight value of an element does not exceed the $M_1$ value, and the second weight value does not exceed the value $M_2$, the element is formed light.

FIG. 7a illustrates the reproduction of a contour of maximum sharpness and medium contrast, corresponding to FIG. 4b, based on the use of first weight values only, while FIG. 7b illustrates the reproduction of the same contour in accordance with the second embodiment of the proposed method. The optical-parameter sampling values for areas A and D located entirely in the darker field, left of the contour 1, are equal to 16, while the optical-parameter sampling values for areas F and I located entirely in the lighter field, right of the contour 1, are equal to 48. Corresponding to these values on the substrate are half-tone dots with relative sizes of 75% and 25%, formed by 48 and 16 dark elements, respectively.

As follows from FIG. 7a and FIG. 7b, the multi-level reflection coefficient samples of areas B, C, E, G and H, all crossed by contour 1, are 17, 40, 32, 24, and 47 respectively. In accordance with said sample values, the elements to be formed dark in the respective area should be 47, 24, 32, 40, and 17 in number. For each of the areas B, C, E, G, and H, there is a pair of adjacent areas, of which one is entirely in the darker part of the image (having a sample value of 16) while the other is entirely in the lighter part of the image (having a sample value of 48). Thus, for area E, such a pair is formed by area D (dark) and area F (light), and, for area H, such a pair will include area D (dark) and area I (light). As shown previously, the relative busyness of an area may be estimated as a ratio of the maximum module of difference between the sampling values of the optical parameters of the areas adjacent to the given area to the maximum possible sampling value $M_{max}$ so that the relative busyness q of any one of said areas crossed by the contour 1 will be q=(48−16)/64=0,5. Thus, for area E, whose sample is 32, expression (3) gives $M_1=M_2=48$.

To consider the formation of three elements in substrate area E, of which the first is in top left corner of area E, the second in the top right corner, and the third in the central part of the area. The first weight values $P_1$ of the elements of the area under consideration are equal to 2, 3, and 63 (FIG. 2b), respectively, and the second weight values $P_2$ to 64, 26, and 34 (FIG. 3b).

For the first element, $P_1=2<48$, $P_2=64>48$. The element is formed dark in accordance with the result of its second weight value being compared with the $M_2$ value.

For the second element, $P_1=3<48$, $P_{2=26<48}$. Element is formed light.

For the third element, $P_1=63>48$, $P_{2=34<48}$. This element is formed dark in accordance with the result of its first weight value being compared with the $M_1$ value.

The other elements of the area are formed in a similar manner. In FIG. 7b, the elements formed dark based on the comparison of its first weight values with the $M_1$ value, are crosshatched in one direction (right-inclined lines) while the elements formed dark based on the comparison of its second weight values with the $M_2$ value, are crosshatched in another direction (left-inclined lines).

When comparing FIG. 7a and 7b, it can be seen that in FIG. 7b the disposition of dark elements in areas B, C, E, G, and H on is more in accord with the geometry of the contour 1 than in FIG. 7a. At the same time, said areas in FIG. 7b have some of the elements right of the contour formed dark, and some of the elements left of the contour formed light, which reflects the reflection coefficient values of the original right and left of a contour of medium contrast.

It may now be examined how, in accordance with the second embodiment of the inventive method, a "degenerating" contour is going to be reproduced on a substrate, meaning a contour, whose contrast is gradually decreasing with its length from the maximum value, corresponding to the maximum sample difference of 63, to the zero value when the samples on both sides of the contour are identical and equal to, e.g., 32. With the contrast at its maximum, when the relative busyness of the contour-containing area is close to unity, $M_1=M_{max}$ and $M_2=M$, in accordance with expression (3). The elements to be formed dark will be those elements only, whose second weight values exceed M, because the first weight value of any element cannot exceed $M_{max}$. Thus, the contour will be reproduced to an accuracy of the size of one element, as shown in FIG. 3c, with there being no half-tone dots in the uniform-toned image fields right and left of the contour.

With decreasing contour contrast, the relative busyness of the contour-containing area will also decrease so that $M_1$ becomes lower than $M_{max}$, and $M_2$ lower than M. The elements to be formed dark will be not only those, whose second weight values exceed $M_2$, but also those, whose first weight values exceed $M_1$. The latter will form half-tone dots similar to those crosshatched inclined to the right in areas B, C, E, G, and H, FIG. 7b. It will be noted that the number of elements to be formed dark based on the comparison of their first weight values with the $M_1$ value and, in consequence thereof, the relative coverage by the half-tone dots formed by said elements, will increases with decreasing relative busyness of the contour-crossed areas. Half-tone dots will likewise be formed on uniformly toned areas other than crossed by the contour and lying on opposite sides there, their relative size being proportional to the averaged absorption coefficient values of said areas.

Finally, when the contour contrast and the relative busyness of the area become close to zero, the values involved will be related, in accordance with expression (3), as follows: $M_1=M$ and $M_2=M_{max}$. As a result, the elements to be formed dark will be those only, whose first weight values exceed M, since the second weight values of elements are a priori less than $M_{max}$. In this case, all the areas of an original are reproduced by a regular structure of identical half-tone dots with a relative size of 50%. In this way, a gradual transition, imperceptible for an observer, is assured along a "degenerating" contour from the structure of a line-work image to the structure of a half-tone dot image, enabling accurate reproduction of gradations for the background areas of a continuous-tone original.

As previously stated, the number of single-toned elements (dark or light) in a substrate area is definitively related to the optical-parameter value of the original area corresponding to said substrate area. At the same time, for some of the elements, it may turn out that their first weight values $P_1$ exceed the supplementary value $M_1$ determined for the area containing said elements, while their second weight values $P_2$ exceed the similar value $M_2$. Thus, for area G in FIGS. 7a and 7b, whose sample is 24, $M_1=M_2=44$. In this area G there are five elements with the first weight values of 46, 55, 59, 50, and 45 (FIG. 2b) and with second weight values of, respectively, 49, 45, 47, 54, and 51 (FIG. 3b). These elements are picked out in FIGS. 2b and 3b by thick solid lines. For each of said elements, its first and second weight values exceed 44. In this case, the total number of elements in the area, to be formed dark based on the results of the aforesaid operations of comparison, will be less than 40 dark elements as based on the optical-parameter sample value 24. Generally, the number of elements with $P_1>M_1$ and $P_2>M_2$ within an area is fairly small so that such distortions in the reproduced image as may be due to said discrepancy in the number of single-toned elements, are not likely to make themselves felt to any appreciable extent. Nevertheless, the present invention provides for the number of elements to be formed dark in an area to be equal to the number based on the corresponding value of the optical parameter, to thereby improve the quality of the half-tone dot image.

To this end, in the event of the first weight value of an element exceeding $M_1$ and the second weight value exceeding $M_2$, the optical-parameter sample value of the area to be reproduced is reduced by unity. As an alternative, it is possible to increase by unity the first or second weight values of all the elements of the area to be formed, without changing the sample value, and then proceed to compare anew the changed weight values with $M_1$ and $M_2$ values. As a result of said additional provisions, the total number of dark elements in a substrate area will correspond to the optical parameter value M of the original area, viz. 40, which is the case in the example under consideration, involving area G, FIG. 7b.

The proposed device for adaptive screening of a continuous-tone original comprises a video signal source 2 (FIG. 8), a light source 3 in the form of, e.g., a laser, a means 4 for the beam from the light source to scan the elements of the areas of a substrate 5, a light-source beam chopper 6, a source 7 of first weight values for the elements of the areas of the substrate 5, a source 8 of second weight values for the elements of the areas of the substrate 5, a beam chopper control unit 9, an unit 10 to estimate the relative busyness of the areas of an original, and means 11 to synchronize signals formed by the video signal source 2 and the beam chopper control unit 9, complete with a capability to make the beam from the light source 3 scan the elements of the areas of the substrate 5.

In addition, according to the preferred embodiments of the invention, the device contains a contour detection unit 12 and a gating circuit 13, even though the presence of said elements is not essential for the embodiment of the invention.

Figure 8:
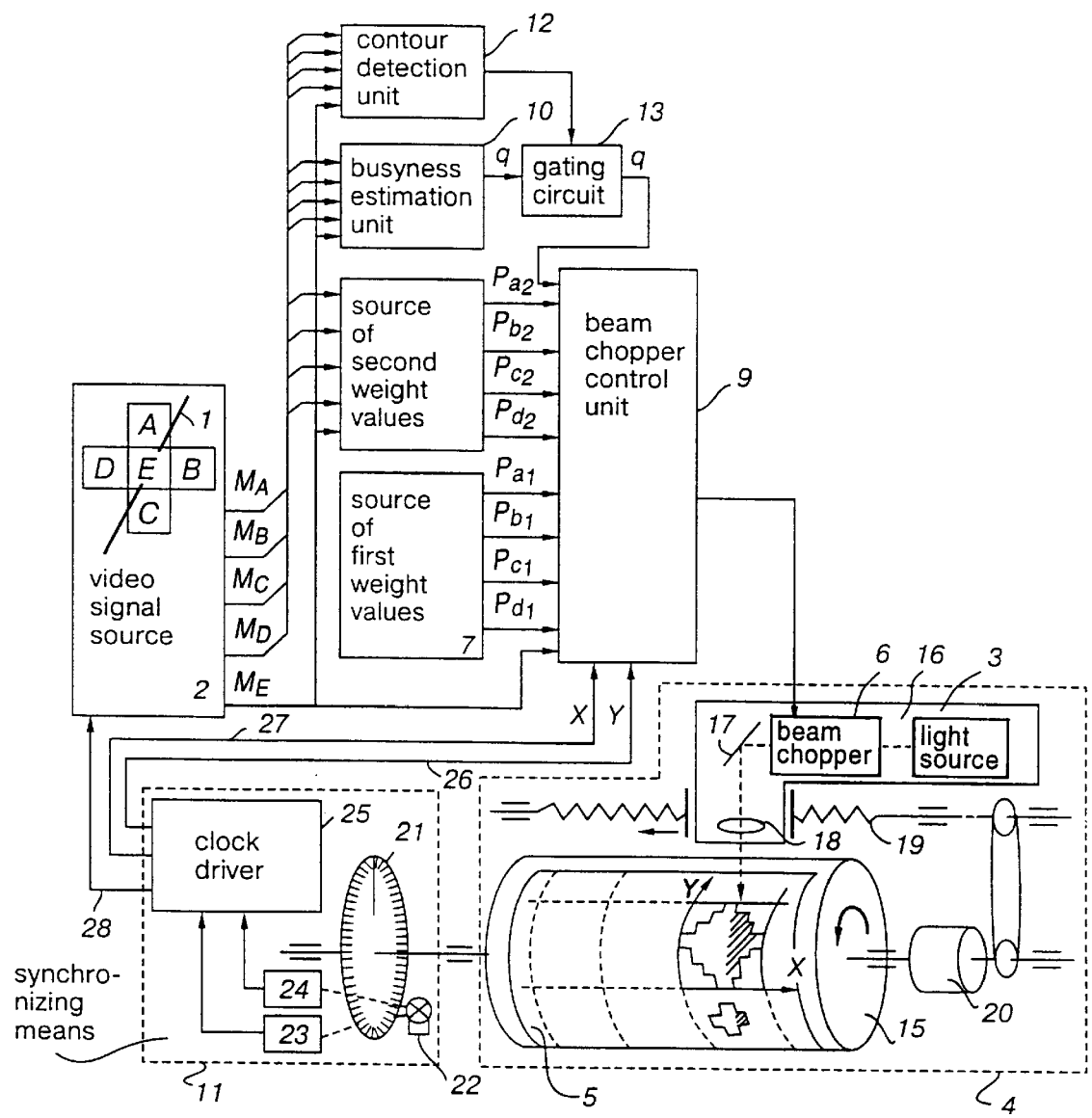
FIG. 8 is a block diagram of the device for adaptive image screening, according to the invention.

The video signal source 2 may be in the form of a video data storage device, a scanner, a TV camera, an output unit for an electric communication channel, etc. Video signals formed by the source 2 characterize the optical parameter values of original areas. FIG. 8 shows five original areas A, B, C, D, and E forming a sample window, but it should be borne in mind that the number of areas in a sample window may be greater. For greater clarity, said areas A, B, C, D, and E are placed within a rectangle denoting the video signal source 2.

In accordance with the number of areas in the sample window, the video signal source 2 in the example under consideration has five outputs.

In this arrangement, the output $M_E$ whose signal characterizes the optical parameter of the original area E being reproduced at the moment, i.e. corresponding to the area of the substrate 5 being exposed to the beam of the light source 3, will hereinafter be referred to as the main output of the source 2, while its outputs $M_A$, $M_B$, $M_C$, and $M_D$, whose signals characterize the optical parameters of areas A, B, C, and D adjoining area E, will be referred to as the supplementary outputs of the source 2. It will be noted here that, as a general case, the number of supplementary outputs for the video signal source 2 may be greater than the number of areas adjoining area E to be reproduced, which is in the center of the sample window.

The main output $M_E$ and the supplementary outputs $M_A$, $M_B$, $M_C$, and $M_D$ of the video signal source 2 are connected to the respective inputs of the second weight-value source 8, the relative busyness-estimating unit 10, and the contour detection unit 12 (if any). Besides, the main output $M_E$ of the source 2 is connected to the first data input of the beam chopper control unit 9.

The means 4 for the beam from the light source 3 to scan the elements of the areas of the substrate 5, comprise a revolving drum 15, with the substrate 5, e.g. a photographic material secured thereto, a carriage 16 to mount the light source 3, the beam chopper 6, a reflector 17, and a lens 18. The carriage 16 is free to move along the drum 15 with the aid of a lead screw 19 kinematically linked with a drum-driving motor 20. The beam chopper 6 may have the form of, e.g., an electrooptical modulator.

The first weight-value source 7 is in the form of, e.g., a ROM storing the recordings of the first weight values for the area elements of the substrate 5, specified as consistent with smooth tone rendition. The number of outputs in the source 7 is equal to that of the area elements of the substrate 5. To make the drawings simpler, it is assumed in the example under consideration that the substrate areas are only subdivided into four elements a, b, c, and d placed, for the sake of clarity, inside original area E, as shown in FIG. 9, although, as a matter of fact, these elements belong to a substrate area corresponding to the E area of an original, and their number is considerably greater than four. Accordingly, the first weight-value source 7 in the example under consideration has four outputs $P_{a1}$, $P_{b1}$, $P_{c1}$, and $P_{d1}$, at which to simultaneously form similarly designated signals to characterize the first weight-values for the elements a, b, c, and d, respectively. The first weight-value source may also have the form of an arithmetic unit to calculate the first weight values for elements from the values of their coordinates X and Y within an area, as taught in GB 2,133,948.

The second weight-value source 8 may be provided in the form as described in GB 1,595,004. Similar to the first weight-value source 7, the number of outputs in the second weight-value source 8 is equal to the number of the area elements of the substrate 5. In this example, the source 8 has four outputs $P_{a2}$, $P_{b2}$, $P_{c2}$, and $P_{d2}$ at which to simultaneously form similarly designated signals to characterize the second weight a, b, c, or the elements a, b, c, and d of substrate 5. In contrast to the first weight values, the second weight values are formed related to the optical parameter values of the area E to be reproduced and areas A, B, C, and D adjacent to area E so as to ensure the desired reproduction accuracy for the contour disposed in the reproduced original area E in a specific manner.

The outputs $P_{a1}$, $P_{b1}$, $P_{c1}$, and $P_{d1}$ of the first-weight value source 7 and the outputs $P_{a2}$, $P_{b2}$, $P_{c2}$, and $P_{d2}$ of the second weight-values source 8 are connected with the corresponding input groups of the beam chopper control unit 9.

The synchronizing means 11 contain, e.g., a transparent disc 21 secured over the shaft of the drum 15 and having a multiplicity radial line marks equispaced round the disk circumference. On one side of the disc 21 is installed an illuminant 22, on the other side photodetectors 23 and 24. The line-mark pitch is selected such that the signals at output from the photodetector 23 have a repetition period equal to the time it takes the substrate 5 to be displaced with the drum relative to the beam from the light source 3 by the amount of one element. The disc 21 also has a solitary line mark positioned so as to interrupt the light flux from the illuminant 22 on to the photodetector 24 once every revolution of the drum 15. The outputs of the photodetectors 23 and 24 are connected with the inputs of a clock driver 25 which incorporates the usual elements, i.e. amplifiers and frequency dividers providing at the clock-driver outputs 26, 27 and 28 a sequences of pulses of desired shape, duration, and frequency. Thus, the outputs 26 and 27 connected with the clock-pulse inputs of the beam chopper control unit 9, form signals at a frequency equal to the rate of displacement of substrate elements relative to the beam from light source 3 in two directions X and Y at right angles to each other, while the output 28 connected to the input of video signal source 2, form signals at a frequency equal to the rate of displacement of substrate areas relative to the beam from light source 3.

In the preferred embodiments of the device, the output q of the relative busyness-estimating unit 10 is connected with the second input of the beam chopper control unit 9 via a gating circuit 13, the control input of which is connected to the output of the contour detection unit 12. The purpose of the gating circuit 13 is to pass on the second input of the beam chopper control unit 9 the output signal q from the relative busyness-estimating unit 10 when there is at the output of the contour detection unit 12 a signal to indicate the presence of a contour in the original area to be reproduced, thus in area E. On the other hand, when there is no signal at the output of the contour detection unit 12 (to signify no contour in said original area), the gating circuit 13 inhibits the passage of the q signal from the output of the relative busyness-estimating unit 10 to the beam chopper control unit 9.

Where there is no contour detection unit 12 in the device, there is no gating circuit 13 either, and the output q of the relative busyness-estimating unit 10 is connected directly to the second input of the beam chopper control unit 9.

According to FIG. 10, the relative busyness-estimating unit 10 comprises six subtract circuits $29_1$ to $29_6$ and a maximum-value selector unit 30 with its six inputs connected to the outputs of said subtract circuits. The inputs of the circuits $29_1$–$29_6$, which make the inputs of the relative busyness-estimating unit 10, are connected with the supplementary outputs $M_A$, $M_B$, $M_C$, and $M_D$ of the video signal source 2 in a manner such that each of said circuits is found to be connected to one of the possible pairs formed by the supplementary outputs $M_A$, $M_B$, $M_C$, and $M_D$, In particular, the subtract circuit $29_1$ has its inputs connected to the supplementary outputs $M_A$ and $M_B$, of the video signal source, the circuit $29_2$ to outputs $M_B$ and $M_C$ of the video signal source, the circuit $29_3$ to outputs $M_C$ and $M_A$, and so on, as shown in FIG. 10. The maximum-value selector unit 30 provides an output signal to characterize the relative busyness, equal to one of its input signals, the maximum in absolute value, divided by the maximum possible value $M_{max}$, of video signal (optical parameter), so that the relative busyness signal may take values from zero to unity. Obviously, apart from the maximum-value selector as such, the selector unit 30 contains a circuit for dividing by the specified $M_{max}$ value. Since such circuits are well known to those skilled in the art, a more detailed description of the selector unit 30 is dispensed with.

As a general case, when the number of supplementary outputs in the video signal source 2 is other than four, it may be said that the number of subtract circuits and the number of inputs in the maximum-value selector unit are equal to the number of binary combinations of the supplementary outputs of the video signal source while each subtract circuit has its input connected to the two supplementary outputs of the video signal source, which form one of said combinations. In the example under discussion, the number of binary combinations from four is equal to six.

Figure 11:
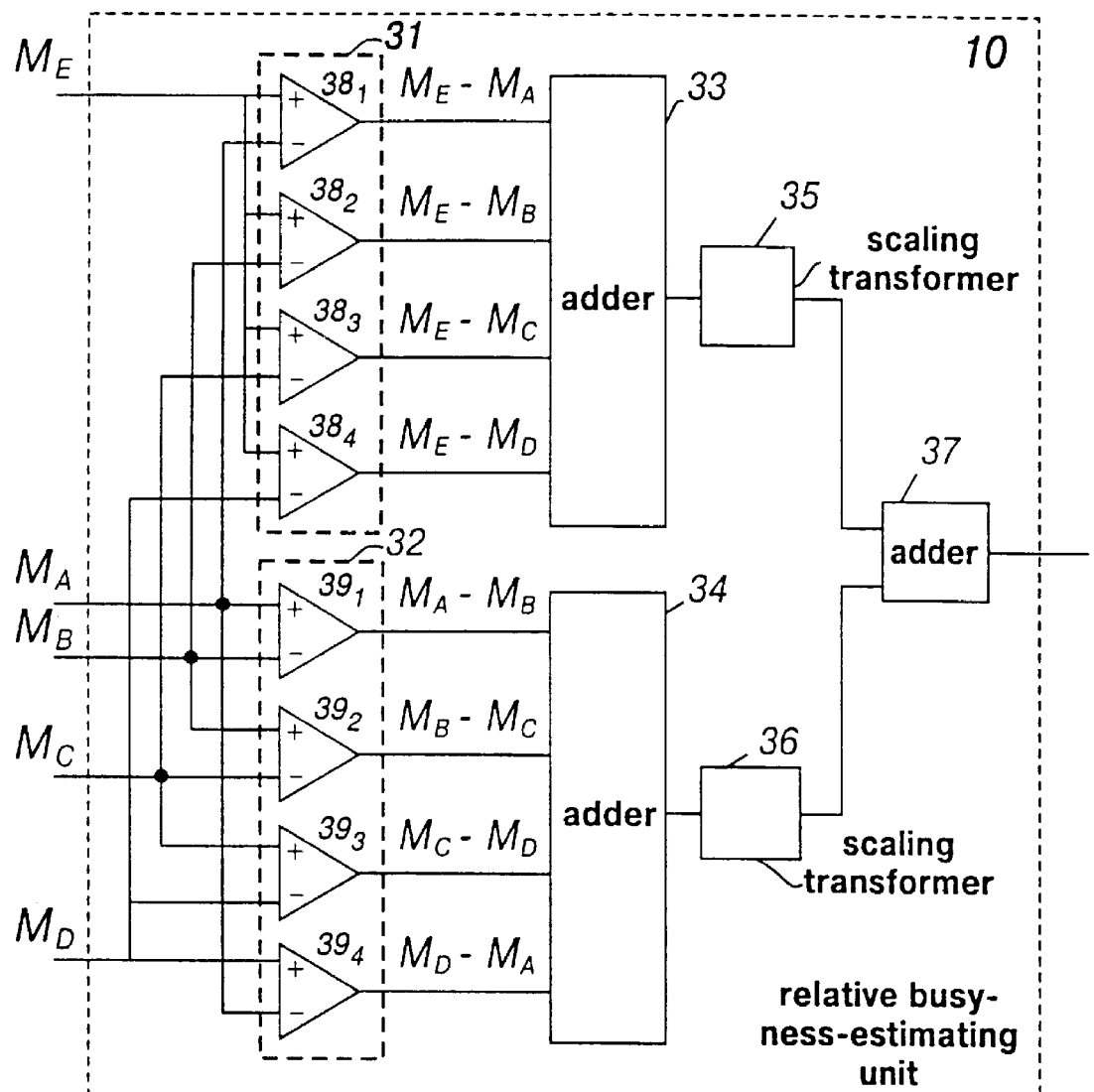

FIG. 11 illustrates another embodiment of the relative busyness-estimating unit 10, where said unit contains two subtract-circuit groups 31 and 32, adders 33 and 34, scaling transformers 35 and 36, and an output adder 37. The outputs of four subtract circuit $38_1$, $38_2$, $38_3$, and $38_4$, comprised in the group 31, are connected with the inputs of the adder 33, while the outputs of four subtract circuits $39_1$, $39_2$, $39_3$, and $39_4$, comprised in the group 32, are connected with the inputs of the adder 34. The outputs of the adders 33 and 34 are connected via the scaling transformers 35 and 36, respectively, to the inputs of the adder 37, whose output forms the output q of a relative busyness-estimating unit 10.

The inputs of the subtraction circuits $38_1$, $38_2$, $38_3$, $38_4$ and $39_1$, $39_2$, $39_3$, $39_4$ make relative busyness-estimating unit 10 and are interconnected to the outputs $M_A$, $M_B$, $M_C$, $M_D$, and $M_E$ of the video signal source 2 in such a way that the unit 10 implements algorithm (2) stated hereinbefore in description of the proposed method. For the example under discussion, as shown in FIG. 8 where the sample window contains five areas, and, consequentially, the video signal source 2 has five outputs, this algorithm assumes the following form:

$$q=1/Q_{max}[k_1(|M_E-M_A|+|M_E-M_B|+|M_E-M_C|+|M_E-M_D|)++k_2(|M_A-M_B|+|M_B-M_C|+|M_C-M_D|+|M_D-M_A|)], \quad (4)$$

where $Q_{max}$ is the maximum possible value of the polynomial enclosed in this expression in square brackets. The value $Q_{max}$ is determined as a preliminary step in the manner indicated in the description of the proposed method.

In accordance with the expression (4) and FIG. 11, each of the groups 31 and 32 unites subtract circuits, whose inputs receive signals characterizing the optical parameters of pairs of adjacent original areas located at an identical distance r from the mid-segments connecting the centers of the areas forming said pairs to the center of the central area E, whose optical parameter is characterized by a signal at the main output $M_E$ of the video signal source 2. Thus, in the group 31, the subtract circuits $38_1$–$38_4$ receive signals characterizing the optical parameters of the following pairs of adjacent areas of the image original: E and A, E and B, E and C, and E and D. All of these pairs of areas are characterized by the identical distance $r_1$, a specific case of the aforesaid distance r. The subtract circuits $39_1$, $39_2$, $39_3$, and $39_4$ of the group 32 receive signals characterizing the optical parameters of the following pairs of adjacent areas of the image original: A and B, B and C, C and D, and D and A. These pairs have a similar identical distance $r_2$, different from the distance $r_1$. (Similar distances r for various pairs formed by nine areas, are shown in FIG. 5.)

The values of factors $k_1$ and $k_2$ in expression (4) are inversely related to, respectively, $r_1$ and $r_2$ and to the number of subtract circuits in, respectively, the groups 31 and 32. In the case under consideration, the number of subtract circuits for the groups 31 and 32 is the same. The added-up output signals of the subtract circuits $38_1$–$38_4$ in the group 31 and of the subtract circuits $39_1$–$39_4$ in the group 32 are multiplied by the factors $k_1$ and $k_2$ in the scaling transformers 35 and 36, respectively. The common factor 1/Qmax preceding the square brackets in expression (4), is a reciprocal of the maximum possible value of the sum enclosed in square brackets. This factor may be accounted for as a factor characteristic of, e.g., the output adder 37. The output signal of the adder 37, characterizing the relative busyness of an original area, may take values of between zero and unity, just as in the case of the circuitry shown in FIG. 10.

Obviously, there may be other systems to use to implement algorithm (4). It is also obvious that increasing the number of supplementary outputs in the video signal source 2 will lead to a corresponding increase in the number of subtract circuit groups and in the number of adders and transformers related thereto.

The present invention provides for two embodiments of the beam chopper control unit 9. According to the first of these embodiments illustrated in FIG. 12, the unit comprises computing units $40_a$, $40_b$, $40_c$, and $40_d$, the number of which equals that of the elements in the substrate area, four in this particular example, a scaling transformer 41, a switching unit 42, and a comparator 43. Each of the computing units designated numerically in common as item 40, with various subscripts to correspond the designation of elements, has three inputs, of which the first is connected with the output q of the relative busyness-estimating unit 10 and forms a second data input for the beam chopper control unit 9. The second input of each computing unit 40 is connected with one of the outputs $P_{a1}$, $P_{b1}$, $P_{c1}$, and $P_{d1}$ of the first weight-value source 7 (FIG. 8), and the third input with that output of the second weight-value source 8, whose signal characterizes the second weight value of the element, the first weight value of which is characterized by the signal at the second input of the computing unit. Thus, the computing unit $40_a$ (FIG. 12) has its second input connected to the output $P_{a1}$ of the first weight-value source 7 and its third input connected to the output $P_{a2}$ of the second weight-value source 8. It will be noted that the said outputs of the sources 7 and 8 form signals to characterize the first and second weight values, respectively, of the same element a. The inputs of the other computing units $40_b$, $40_c$, and $40_d$ are connected in a similar manner. The second inputs of the computing units $40_a$, $40_b$, $40_c$, and $40_d$ connected to the outputs $P_{a1}$, $P_{b1}$, $P_{c1}$, and $P_{d1}$ of the first weight-value source 7, form a group of third data inputs for the beam chopper control unit 9, while the third inputs of said computing units connected to the outputs $P_{a2}$, $P_{b2}$, $P_{c2}$, and $P_{d2}$ of the second weight-value source 8, form a group of fourth data inputs for the beam chopper control unit 9.

Each of the computing units 40 forms at its output a signal $P_3'$ in accordance with the expression $$P_3'=qP_2+(q_{max}-q)P_1, \quad (5)$$

where q is the signal at the first input of the computing unit 40, i.e. the signal from the output of the relative busyness-estimating unit 10, $P_2$ and $P_1$ are the signals, respectively, at the second and third inputs of the computing unit 40, characterizing, respectively, the second and first weight values of the exposed element, and $q_{max}$ is the maximum possible value of relative busyness.

The method used to determine the value $q_{max}$ has been disclosed hereinbefore in the description of the proposed method of this invention.

Figure 13:
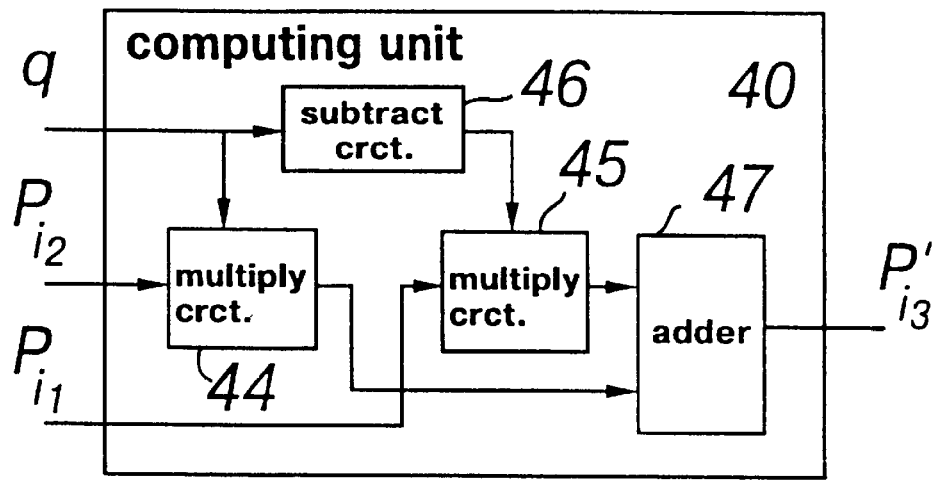
FIG. 13 is a computing unit in the beam chopper control unit in the device as shown in FIG. 12.

The computing unit 40 may have the circuitry as shown in FIG. 13. According to FIG. 13, the computing unit comprises multiply circuits 44 and 45, a subtract circuit 46, and an adder 47. When interconnected, the input of the subtract circuit 46 and the first input of the multiply circuit 44 combine to form the first input of the computing unit 40, connected with the output q of the relative busyness-estimating unit 10. The first input of the multiply circuit 45 forms the second input of the computing unit 40, connected to the respective output $P_{i1}$ of the first weight-value source 7, while the second input of the multiply circuit 44 forms the third of the computing unit 40, connected to the respective output $P_{i2}$ of the second weight-value source 8. (Here the subscript i denotes the element, whose weight values are supplied to the inputs of the i-th computing; in the case under consideration, i may stand for a, b, c, or d.) The subtract circuit 46 forms an output signal equal to the difference between the $q_{max}$ signal corresponding to the maximum relative busyness value and q signal fed to its input. The output of the subtract circuit 46 is connected with the second input of the multiply circuit 45. The outputs of the multiply circuits 44 and 45 are connected with the inputs of the adder 47, whose output forms that of the computing unit.

Obviously, there may be other computing units, different from that shown in FIG. 11, that can be used to form the signal defined by the above expression (5).

Signals $P'_{a3}$, $P'_{b3}$, $P'_{c3}$, and $P'_{d3}$ at the outputs of the computing units $40_a$, $40_b$, $40_c$, and $40_d$ (FIG. 12) correspond to unnormalized third weight values for substrate elements, with due account taken of the relative busyness of the image. To obtain signal to characterize normalized third weight values for elements, there is the scaling transformer 41. The number of inputs in the scaling transformer, as well as the number of its outputs, is equal to the number of elements in a substrate area, hence to the number of computing units 40. The inputs of the transformer 41 are connected to the outputs of the respective computing units 40. The scaling transformer 41 forms at each of its outputs, four in this particular case, a signal characterizing the normalized third weight value for the respective element, a, b, c, or d. This signal $P_{i3}$ for the i-th element is equal to $P'_{i3} M_{max}$, where $P'_{i3}$ is the signal at the i-th input of the transformer 41 (i.e. the output signal of the i-th computing unit 40), $M_{max}$ is the maximum possible video-signal value from the video signal source, and $P'_{3max}$ is the maximum of the signals $P_{a3}$, $P_{b3}$, $P_{c3}$, and $P_{d3}$ supplied to the inputs of the transformer 41. Thus, if the $P'_{b3}$ signal has the maximum value, then the output signal of the transformer 41, corresponding to the normalized third weight value of, e.g., element c, is equal to $P_{c3}=P'_{c3}M_{max}/P'_{b3}$.

The scaling transformer 41 is a multi-channel device comprising a maximum-value selector unit designed to select the maximum of its input signals, and multiply and divide circuits for each channel—of the total of four in the case under consideration. All of said circuits are generally familiar, therefore no more detailed description of the transformer 41 will follow.

The switching unit 42 has four inputs (to match the number of substrate elements), each connected to the respective one of the outputs $P_{a3}$, $P_{b3}$, $P_{c3}$, and $P_{d3}$ of the scaling transformer 41. The switching unit 42 likewise has two control inputs which form the clock-pulse inputs of the beam chopper control unit 9, connected to the outputs 26 and 27 of the synchronizing means 11 (FIG. 8) and receiving signals to indicate the addresses of elements of the substrate 5, related to the coordinates X and Y within an area. The output of the switching unit 42 (FIG. 12) is connected with one of the inputs of the comparator 43, whose other input forms the first data input of the beam chopper control unit 9 (FIG. 8), connected to the main output $M_E$ of the video signal source 2. In accordance with the addresses of elements, supplied to the control inputs of the switching unit 42 from the outputs 26 and 27, it provides for the passage to the comparator 43 of the signal from that output of the scaling transformer 41, where the third weight value for the element exposed to the beam from the light source 3 (FIG. 8) is formed. Switching units operated by two control signals are widely known. The output of the comparator 42 makes the output of the beam chopper control unit 9 and is connected with the input of the beam chopper 6 (FIG. 8).

Figure 14:
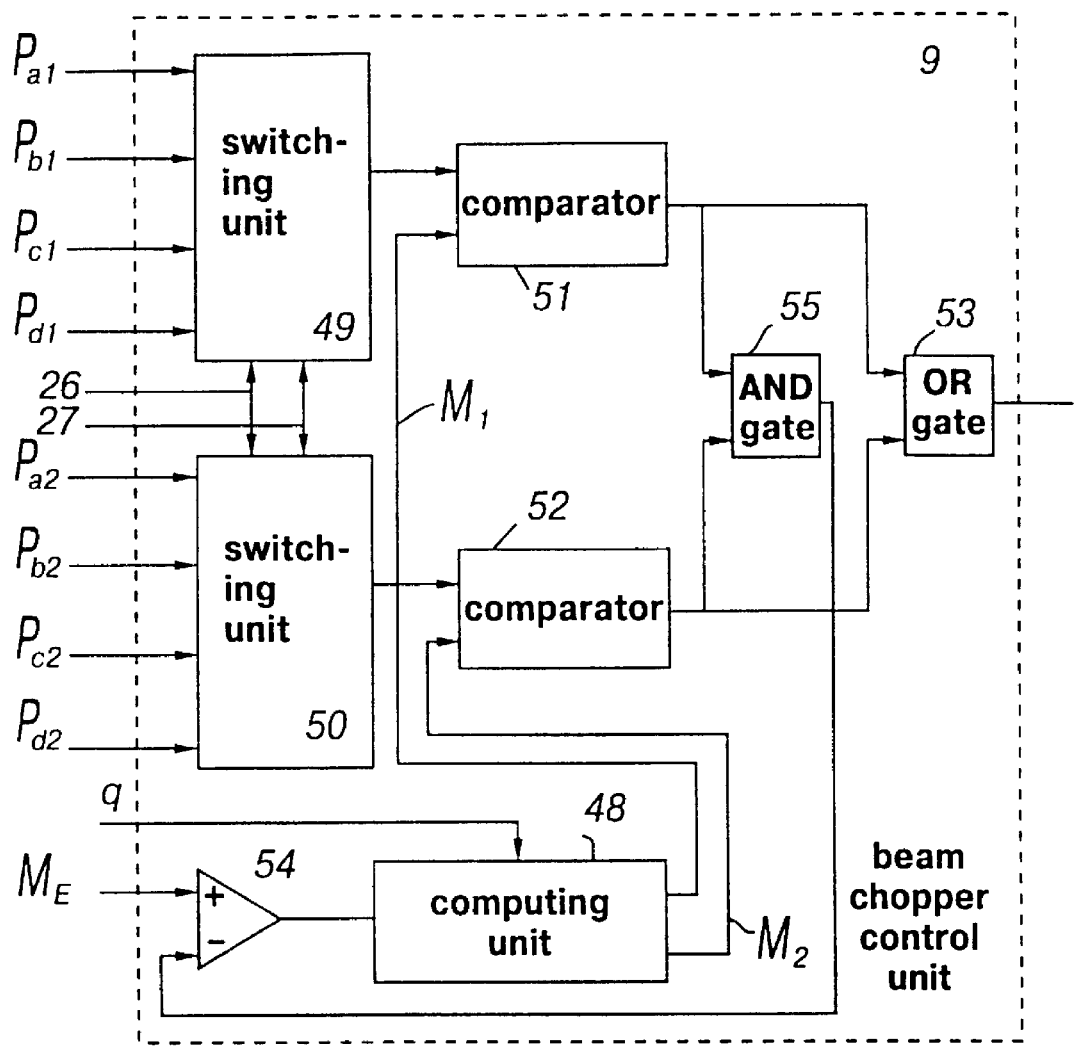
FIG. 14 is an another embodiment of the beam chopper control unit in the device as shown in FIG. 8.

FIG. 14 shows a second embodiment of the beam chopper control unit 9, wherein the input contains a computing unit 48, two switching units 49 and 50, two comparators 51 and 52, an OR gate 53, and, as optional elements, a subtract circuit 54 and AND gate 55.

The first input of the subtract circuit 54 forms the first data input of the beam chopper control unit 9, connected with the main output of the $M_E$ of the video signal source 2 (FIG. 8), while the output of the subtract circuit 54 (FIG. 14) is connected with the first input of the computing unit 48, the second input of which makes the second data input of the beam chopper control unit 9, connected to the output q of the relative busyness-estimating unit 10 (FIG. 8). In the event of there being no subtract circuit 54 (FIG. 14) and no AND gate 55, the main output $M_E$ of the video signal source 2 is connected directly with the first input of the computing unit 48 which, in this case, is the first data input of the beam chopper control unit 9. The computing unit 48 has two outputs, of which the first is connected with the first input of the comparator 51, and the second with the first input of the comparator 52. The computing unit forms at its output connected to the comparator 51 a signal $M_1$ defined as $$M_1=M+q(M_{max}-M), \qquad (6)$$

and at its output connected to the comparator 52 a signal $M_2$ defined as $$M_2=M_{max}-q(M_{max}-M), \qquad (7)$$

where M and q are the input signals of the computing unit 48, and $M_{max}$ is the maximum possible video signal value.

Figure 12:
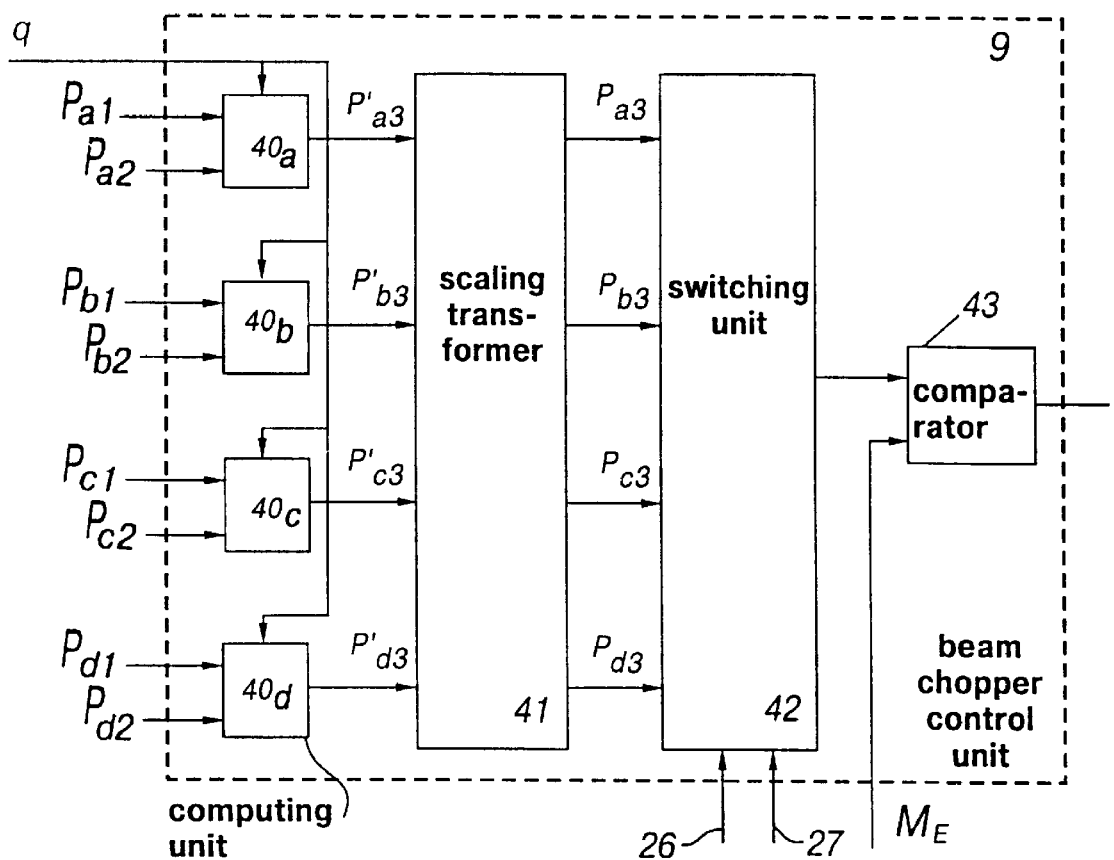
FIG. 12 is one of the embodiments of the beam chopper control unit in the device as shown in FIG. 8.

The switching units 49 and 50 are similar in design to the switching unit in FIG. 12. The number of signal inputs of each of the switching units 49 and 50 are equal to that of the elements in the substrate area, e.g. four in the example under discussion. The signal inputs of the switching unit 49 form a group of third inputs for the beam chopper control unit 9, connected to the outputs $P_{a1}$, $P_{b1}$, $P_{c1}$, and $P_{d1}$ of the first weight-value source 7 (FIG. 8), while the signal inputs of the switching unit 50 (FIG. 14) form a group of fourth inputs for the beam chopper control unit 9, connected to the outputs $P_{a2}$, $P_{b2}$, $P_{c2}$, and $P_{d2}$ of the second weight-value source 8 (FIG. 8). The output of the switching unit 49 (FIG. 14) is connected with the second input of the comparator 51, and the output of the switching unit 50 with the second input of the comparator 52.

The two switching units 49 and 50 have each two control inputs forming clock-pulse inputs for the beam chopper control unit 9, the latter inputs being connected to the outputs 26 and 27 of the synchronizing means, with the result that the switching units 49 and 50 operate in step, i.e. when the switching unit 49 passes to the comparator 51, e.g., a signal $P_{a1}$, corresponding to the first weight value of the element a exposed to the beam from the light source, the switching unit 50 passes to the comparator 52 a signal $P_{a2}$ corresponding to the second weight value of the same element a. The outputs of the comparators 51 and 52 are connected via the AND gate 55 to the second input of the subtract circuit 54 (where these elements are provided).

Figure 15:
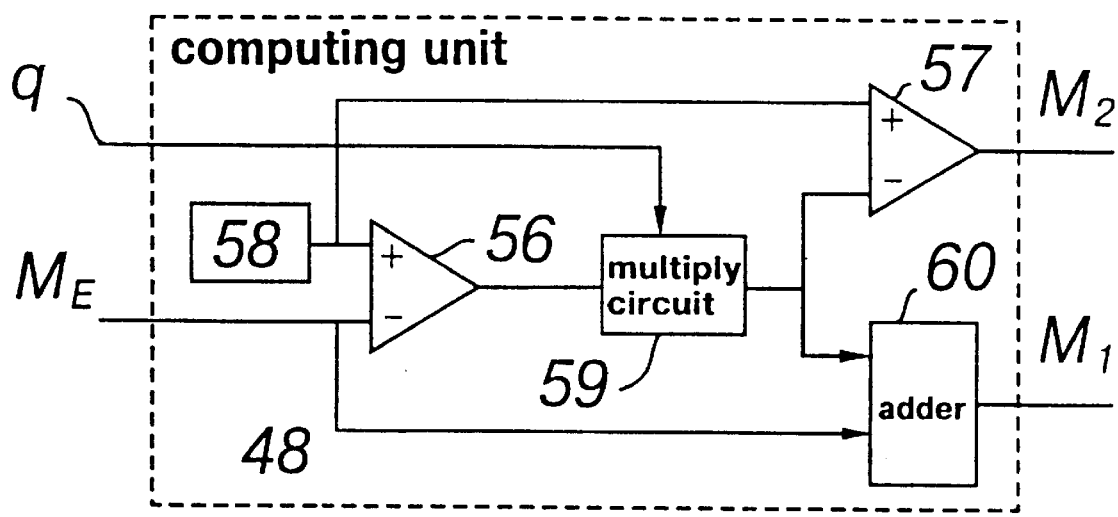
FIG. 15 is a computing unit in the beam chopper control unit in the device as shown in FIG. 8.

The computing unit 48 shown in FIG. 15, comprises two subtract circuits 56 and 57, a maximum video-signal value source 58, a multiply circuit 59, and an adder 60. The first input of the subtract circuit 54 is connected with the first input of the adder 60 to form the first input of the computing unit 48, connected to the main output $M_E$ of the video signal source. The output of the maximum video-signal value source 58 is connected with the second input of the subtract circuit 56 and with the first input of the subtract circuit 57. The multiply circuit 59 has one input connected to the output of the subtract circuit 56. The other input of the multiply circuit 59 makes a second input for the computing unit 48, connected to the output q of the relative busyness-estimating unit 10, while the output of the multiply circuit 59 is connected with the second input of the adder 60 and with the second input of the subtract circuit 57. The output of the adder 60 is that output of the computing unit 48 which is connected to the comparator 51, while the output of the subtract circuit 57 is that output of the computing unit 48 which is connected to the comparator 52.

Figure 16:
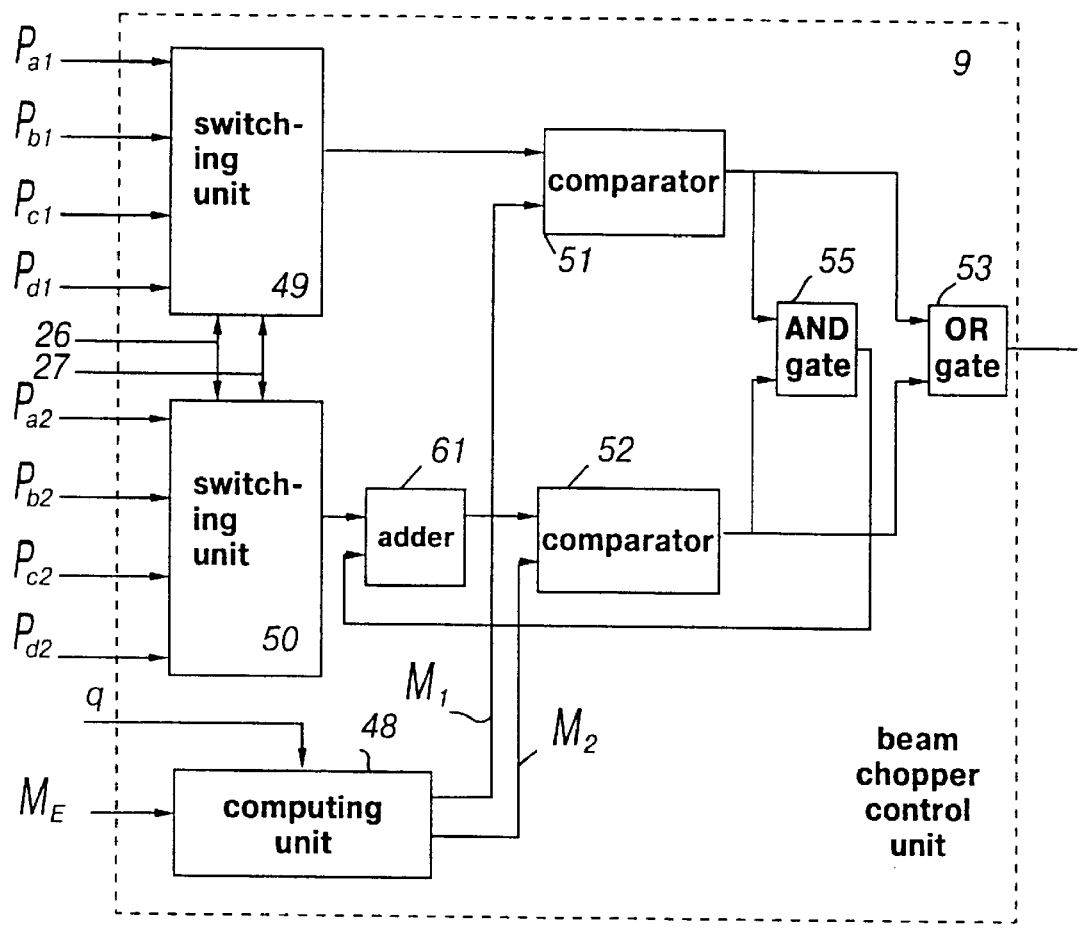
FIG. 16 is still another embodiment of the beam chopper control unit in the device as shown in FIG. 8.

FIG. 16 illustrates still another embodiment of the beam chopper control unit 9 differing from the one shown in FIG. 14 in that there is no subtract circuit 54 and the first data input of the beam chopper control unit 9 is connected to the first input of the computing unit 48 directly. Besides, according to FIG. 16, the output of the switching unit 50 is connected to the input of the comparator 52 through an adder 61, one of whose two inputs is also connected with the output of the AND gate 55. For the rest, the circuitries in FIG. 16 and 14 are identical, and in this connection their common elements are numbered alike. The adder 61 may be connected between the switching unit 49 and the comparator 51.

According to FIG. 17, the contour detection unit 12 comprises four comparison circuits $62_1$, $62_2$, $62_3$, and $62_4$, two AND gates 63 and 64, and an OR gate 65. The first inputs of the comparison circuits $62_1$–$62_4$ are interconnected to form a main input for the contour detection unit 12,to be connected to the main output $M_E$ of the video signal source. The second inputs of the comparison circuits $62_1$–$62_4$ make supplementary inputs for the contour detection unit 12, and these are connected to those of the supplementary outputs $M_A$, $M_B$, $M_C$, and $M_D$ of the video signal source which form signals to characterize the optical parameters of the original areas A, B, C, and D adjoining, as shown in FIGS. 8 and 9, the original area E at top, right, bottom, and left, the optical parameter of said area E being characterized by a signal at the main output $M_E$ of the video signal source 2. (In the example illustrated in FIG. 8, said outputs are the only supplementary outputs of the video signal source 2, but the total number of supplementary outputs for the source 2 may be greater.)

Each of the comparison circuits $62_1$–$62_4$ is designed to form a signal at its output based on the condition that its input signals are unequal to one another. The outputs of the comparison circuits $62_1$ and $62_3$, whose second inputs are connected to the outputs $M_A$ and $M_C$ of the video signal source, designed to form signals to characterize the optical parameters of areas A and C adjoining area E at top and at bottom, are connected with the inputs of the AND gate 63. The outputs of the comparison circuits $62_2$ and $62_4$, whose second inputs are connected to the outputs $M_B$ and $M_D$ of the video signal source, designed to form signals to characterize the optical parameters of areas B and D adjoining area E at right and at left, are connected with the inputs of the AND gate 64. The outputs of the AND gates 63 and 64 are connected with the inputs of the OR gate 65, whose output serves as the output of the contour detection unit 12.

The contour detection unit 12 may also use some other circuit design, for example, one similar to that described in SU 1,190,537.

The circuit designs of the proposed device and individual components thereof, as illustrated in FIGS. 8 through 17, as well as the description of their operation that follows, presuppose—for fewer drawings and simpler description—the use of "window" composed of five areas A, B, C, D, and E and the subdivision of substrate areas into four elements each, as shown in FIG. 9. It is obvious, however, that the number of connections between the video signal source 2 and the units 10 and 12 in the proposed device, is dependent upon the shape and size of the "window" of original areas, whose optical parameter values are to be used for image screening, and may be different from that adopted for the present description. Likewise different may be the number of connections between the weight value sources 7 and 8 and the beam chopper control unit 9, this being dependent upon the number m of elements, into which the areas of the substrate 5 are subdivided. For the same reasons, there may be some differences in the numbers of circuit elements of the same type, used in individual units comprised in the device, without any alterations in their functions and interconnections as proposed in the invention.

The proposed device operates as follows.

In the process of reproducing a continuous-tone original, the drum 15 (FIG. 8) with a substrate 5 secured thereto, is rotating driven by the motor 20, with the carriage 16 moving along the drum. The angular distance between adjacent elements in the substrate 5, exposed to the beam from the light source 3, is equal to the angular distance between adjacent line marks on disk 21. For this reason, signals at the output of the photodetector 23 have a repetition period equal to the time it takes the beam from the light source 3 to be displaced with the drum over the substrate by the amount of one element. Said signals are converted (divided by two in the example under consideration) in the clock driver 25 to be supplied from its output 28 to the video signal source 2 as clock pulses at a frequency equal to the rate of displacement with the drum 15 of areas of the substrate 5 relative to the beam from light source 3. Said clock pulses cause simultaneous extraction of the multi-level samples $M_A$, $M_B$, $M_C$, $M_D$, and $M_E$ of the optical parameters of the original areas from the video signal source 2. The means to simultaneously obtain at the outputs of video signal source several multi-level sample values while the drum 15 rotates and the carriage 16 moves along the drum, are described, for example, in U.S. Pat. No. 5,229,867. Said samples are supplied simultaneously to the second weight-value source 8, the contour detection unit 12, and the relative busyness-estimating unit 10 to be present at their inputs for the time it takes the substrate 5 to be displaced relative to the beam from the light source 3 by the amount of one element.

During said time, the signal $M_E$ from the main output of the video signal source 2 is present at the first data input of the beam chopper control unit 9. The signals $P_{a1}$, $P_{b1}$, $P_{c1}$, and $P_{d1}$ of the pre-specified first weight value from the source 7 in the form of, e.g., a ROM, are present at the group of third data inputs of the unit 9.

Based on the $M_A$, $M_B$, $M_C$, $M_D$, and $M_E$ sampling values, the source 8 puts out second weight values $P_{a2}$, $P_{b2}$, $P_{c2}$, and $P_{d2}$ the distribution of which over the elements of a substrate area depends upon the geometry of the contour in the "window" comprising areas A, B, C, D and E. A second weight-value source is described, for example, in GB 1,595, 004. Said weight values are supplied to the group of fourth data inputs of the beam chopper control unit 9.

For the background areas of an original, with no contours present therein, the signal values at the main $M_E$ and supplementary $M_A$, $M_B$, $M_C$, and $M_D$ outputs of the video signal source 2, show no difference. The signal q at the output of the relative busyness-estimating unit 10, the operation of which will be elucidated below, is equal zero. Accordingly, likewise equal to zero is the signal at the second data input of the beam chopper control unit 9, connected with the output of the relative busyness-estimating unit 10.

In the first embodiment of the beam chopper control unit 9 (FIG. 12), the signals $P'_{a3}$, $P'_{b3}$, $P'_{c3}$, and $P'_{d3}$ at the outputs of the computing units 40 prove to be respectively equal to the first weight values $P_{a1}$, $P_{b1}$, $P_{c1}$, and $P_{d1}$, as it follows from expression (5), with due to account of $q_{max}$ being equal to unity. The signals at the output of the scaling transformer 41 also have the same values, equal to $P_{a1}$, $P_{b1}$, $P_{c1}$, and $P_{d1}$. In accordance with the X and Y addresses of the elements of substrate areas, arriving at the control inputs of the switching unit 42 from the outputs 26 and 27, the first input of the comparator 46 receives the first weight values of the elements. The second input of said comparator receives from the first data input of the beam chopper control unit 9 a signal $M_E$ corresponding to the optical parameter of the central area E in the "window" composed of the areas shown in FIG. 9. Output signals from the unit 9 are supplied to the light-source beam chopper, an electrooptical modulator. The beam from the light source 3 irradiates those elements of the given area of the substrate 5 (a photographic film), whose weight values exceed $M_E$, forming on the film half-tone dots of a shape fully dependent on the pre-specified distribution of first weight values and assuring the maximum number of original tone gradations that can be reproduced.

In another embodiment of the beam chopper control unit 9 (FIGS. 14 and 16), at zero busyness for the background original areas, the zero q-signal value at its second data input provides for a signal $M_1$ equal to $M_E$ at the first output of the computing unit 48, in accordance with (6) and (7), and a signal $M_2$ equal to $M_{max}$ (64 in the example under consideration) at the second output of the computing unit 48. Said signal $M_{max}$ is supplied to the first input of the comparator 52, whose output signals are equal to zero because of the second input of comparator 52 receiving the second weight values $P_{a2}$, $P_{b2}$, $P_{c2}$, and $P_{d2}$, which never exceed $M_{max}$. The signals at the outputs of the comparator 51, the OR gate 53, and the unit 9 as a whole turn out to be equal to a logical 1 when some one of the first weight values $P_{a1}$, $P_{b1}$, $P_{c1}$, and $P_{d1}$ arriving at the first input of the comparator 51, exceeds the value $M_1=M_E$ arriving at its second input from the first output of the computing unit 48, formed by the output of its adder 60 (FIG. 15). In such cases, the signals at the output of the AND gate 55 (FIGS. 14 and 16) are equal to zero. That is why the result of the operation of the beam chopper control unit 9 in the embodiments illustrated in FIGS. 14 and 16 is the same when reproducing background areas. Similar to the embodiment of the unit 9 according to FIG. 12, examined previously, the image consists of half-tone dots of a shape entirely dependent on the pre-specified first weight values, and conforms to the models presented in FIGS. 2b and 7a.

In certain cases, the central area E may be wholly in the background portion of the original while some of the adjacent areas, e.g. areas A and D may be crossed by the line 1 of a contour, as shown in FIG. 9. In such a case, as will be shown later, the output signal from the relative busyness-estimating unit 10 is other than zero, and the area of the substrate 5, corresponding to the area E of the original, will not be formed therefore, as a half-tone dot corresponding to the background of an image, even though there is no contour crossing area E.

To avoid this, the proposed device incorporates a contour detection unit 12 (FIG. 8). In the case under consideration, illustrated by FIG. 9, where the signals $M_E$, $M_B$, and $M_C$ are equal to one another, and the signals $M_A$ and $M_D$ differ therefrom, there will be signals appearing at the outputs of the comparison circuits $61_1$ and $61_4$ (FIG. 17), with no signals at the outputs of the comparison circuits $61_2$ and $61_3$. As a result, a logical 0 signal will form at the outputs of AND gates 63 and 64 and at the output of the OR gate 65, which signal will hold the gating circuit 13 (FIG. 8) closed so that the signal q from the output of the relative busyness-estimating unit 10 will not be able to pass to the second input of the beam chopper control unit 9, and the latter's operation will not differ from the case considered previously of the area "window" being located in the background portion of a continuous-tone original.

If area E is crossed by a contour 1 directly, as shown, for example, in FIG. 8, and the contour is one of maximum contrast, then the output signal of the contour detection unit 12 is equal to a logical 1, inasmuch as the $M_E$ signal is equal to neither of the $M_A$, $M_B$, $M_C$, or $M_D$ signals. Said signal from the output of the contour detection unit 12 (FIG. 8) enables the q signal from the output of the relative busyness-estimating unit 10 to pass through the gating circuit 13 on the second input of the beam chopper control unit 9. In the case of the relative busyness-estimating unit 10 being executed in accordance with FIG. 10, its output signal q will be equal to the absolute difference between the signals $M_B$ and $M_D$, divided by the maximum possible video-signal value $M_{max}$ (i.e. by 64). This difference $M_B$-$M_D$ is the maximum one in absolute value of the sox differences supplied from the subtract circuits $29_1$–$29_6$ (FIG. 10) to the input of the maximum-value selector unit 30, and the absolute value of said difference ($M_B$-$M_D$) is equal to $M_{max}$ (64) since, as may be seen from FIG. 8, only areas B and D are located entirely one in light, the other in dark parts of the image, separated one from other by contour 1. Thus, the signal q from the output of the relative busyness-estimating unit 10 is equal to ($M_B$-$M_D$)/$M_{max}$=1.

If the relative busyness-estimating unit 10 is designed according to FIG. 11, then the output signals of the subtract circuits $38_1$, $38_2$, $38_3$ and $38_4$ equal to $M_E$-$M_A$, $M_E$-$M_B$, $M_E$-$M_C$, and $M_E$-$M_D$, respectively, as well as the output signals of the subtract circuits $39_1$, $39_2$, $39_3$, and $39_4$ equal to $M_A$-$M_B$, $M_B$-$M_C$, $M_C$-$M_D$, and $M_D$-$M_A$, respectively, will be other than zero. The output signals of the subtract circuits $38_1$–$38_4$, in their absolute values, are added up in the adder 33 while the output signals of the subtract circuits $39_1$–$39_4$, in their absolute values, are added up in the adder 34. The output signals from the adder 33 is multiplied in the scaling transformer 35 by the maximum factor equal, e.g., unity while the output signals from the adder 34 is multiplied in the scaling transformer 36 by a lower factor equal, e.g., to 0.7 since, as may be easily shown, for the pairs E and A, E and B, E and C, and E and D formed by adjacent original areas, the distance $r_1$ from the center of area E to the mid-segments connecting the area centers in each of said pairs, is greater than the similar distance $r_2$ for the pairs of original areas A and B, B and C, C and D, and D and A by $\sqrt{2}$ times. The output signal q of the relative busyness-estimating unit 10 is the sum of the signals from the transformers 35 and 36, divided by the maximum possible value of this sum. Similar to what has been done above in describing the proposed method, it may be shown that in the case under consideration the sum of signals supplied to the inputs of the adder 37 is equal to said maximum possible value of the sum so that the output signal q from the adder 37, characterizing the relative busyness of area E in FIG. 8, is equal to unity.

Consequently, in accordance with expression (3), the signals $P'_{a3}$, $P'_{b3}$, $P'_{c3}$, and $P'_{d3}$ at the outputs of the computing units 40$_a$, 40$_b$, 40$_c$, and 40$_d$ (FIG. 12) are equal, respectively, to the signals $P_{a2}$, $P_{b2}$, $P_{c2}$, and $P_{d2}$ characterizing the second weight values of elements a, b, c, and d. The same signals will be present at inputs of the scaling transformer 41. Thus, in the comparator 43, the value $M_E$ of the optical parameter of area E is compared with the second weight values $P_{a2}$, $P_{b2}$, $P_{c2}$, and $P_{d2}$, whose distribution over the elements within the substrate area best meets the geometry of the given contour 1 shown in FIG. 8. This contour is reproduced on the substrate 5 to the accuracy of one element, similar to what is shown in FIG. 3a.

When reproducing area E with a contour of maximum contrast (q=1), the same result is achieved with the beam chopper control unit 9 designed according to FIG. 14 or FIG. 16. In accordance with expressions (6) and (7), the computing unit 48 forms at its first output a signal $M_1=M_{max}$, to be supplied to the comparator 51, and at its second output a signal $M_2=M_E$ to be supplied to the comparator 52. The comparator 52 compares the signal $M_2=M_E$ with each of the second weight values $P_{a2}$, $P_{b2}$, $P_{c2}$, and $P_{d2}$ supplied from the switching unit 50 and forms logical 1 output signals when the second weight values of any elements exceed the $M_E$ value. The comparator 51 compares the signal $M_1=M_{max}$ with each of the first weight values $P_{a1}$, $P_{b1}$, $P_{c1}$, and $P_{d1}$ supplied from the switching unit 49 and forms logical 0 output signals since none of the first weight values exceeds the maximum video-signal value $M_{max}$. It is for this reason that the output signals of the OR gate 53, whose output makes one for the beam chopper control unit 9, are in effect the output signals of the comparator 52. Thus, controlling the beam chopper 6 (FIG. 8) to form elements of the substrate 5 dark or light, is based on the results of comparing the signal $M_E$ of the optical parameter of the area E to be reproduced with the second weight values $P_{a2}$, $P_{b2}$, $P_{c2}$, and $P_{d2}$ of the elements of the respective substrate area.

If the contour crossing original area E is not of maximum contrast or is blurred within the bounds of the area, then the maximum one of the differences $(M_A-M_B)$, $(M_B-M_C)$, $(M_C-M_D)$, and $(M_D-M_A)$ at the outputs of the subtract circuits 29$_1$–29$_6$ (FIG. 10) comprised in the relative busyness-estimating unit 10, will not be equal to the maximum video-signal value $M_{max}$. Similarly, in the relative busyness-estimating unit 10 designed according to FIG. 11, the sum of the absolute values of the differences $(M_E-M_A)$, ... $(M_E-M_D)$, and $(M_A-M_B)$, ... $(M_D-M_A)$ multiplied by the respective factors, in accordance with expression (4), will be less than the maximum possible value of this sum. Therefore, the relative busyness signal q from the output of the unit 10, whatever the latter's embodiment, will be less than the maximum relative busyness signal $q_{max}$, i.e. less than unity.

To consider the operation of the proposed device when the relative busyness signal q is equal to 0.5 $q_{max}$=0.5. In this case, in the beam chopper control unit 9 designed according to FIG. 12, with the computing units 40$_a$–40$_d$ and the scaling transformer 41 forming the third weight values $P_{a3}$—$P_{d3}$ the first, $P_{a1}$–$P_{d1}$, and second, $P_{a2}$–$P_{d2}$, weight values are accounted for multiplied equally by the same factor of 0.5, as follows from expression (5). Said third weight values $P_{a3}$–$P_{d3}$ feed through the switching unit 42 into the comparator 43 where they are compared with the value $M_E$ of the optical parameter of the original area E. The signals from the output of the comparator 43 control the light-source beam chopper 6 (FIG. 8), ensuring the formation of the area of the substrate 5 in a manner similar to that shown in FIG. 6b, with a degree of correction of the screening distortions of the contour geometry, proportionate to the busyness of the original area E to be reproduced.

In the beam chopper control unit 9 designed according to FIGS. 14 or 16, each of the signals $M_1$ and $M_2$ at the outputs of the computing unit 48 is equal, in accordance with expressions (6) and (7), to $0.5(M_{max}-M_E)$. The signal $M_1$ is compared in the comparator 51 with the first weighting values $P_{a1}$–$P_{d1}$ supplied from the switching unit 49 while the signal $M_2$ is compared in the comparator 52 with the second weight values $P_{a2}$–$P_{d2}$ supplied from the switching unit 50. The output signals from the two comparators 51 and 52 feed through the OR gate 53 on to the beam chopper 6 (FIG. 8) to disable or enable it in order to form elements of the substrate 5 dark or light. It will be noted that here, as in the circuit design of the unit 9 according to FIG. 12, the forming of elements dark or light accounts for their first and second weight values in equal measure, even if indirectly, because the $M_1$ and $M_2$ signals, with which to compare the first and second weight values, are equal in value. The result of reproduction of area E will be the same as that established when the circuit design according to FIG. 12 was examined.

When using the beam chopper control unit 9 designed as shown in FIGS. 14 or 16, it may turn out that some of the elements are to be formed dark as a result of both their first weight values exceeding the $M_1$ value and their second weight values exceeding $M_2$ value, i.e. as a result of both comparators 51 and 52 putting out simultaneously logical 1 signals. In such a case, the total number of elements within an area, to be formed dark, will be smaller than the number of dark elements determined by the optical parameter value of the original area to be reproduced.

To eliminate this disparity which may lead to some distortion in the mean value of the optical parameter of the original area, a subtract circuit 54 and an AND gate 55 are provided in the beam chopper control unit according to FIG. 14. The logical 1 signal appearing at the output of the AND gate 55 in said case is subtracted in the subtract circuit 54 from the $M_E$ signal of the optical parameter of area E, reducing the signal at the output of the computing unit 48. In this connection, the probability is increased of forming dark one of the remaining elements in the area, despite its first or second weight value being only equal to, rather than greater than, the $M_E$ signal value.

The same problem finds a different solution in the beam chopper control unit 9 according to FIGS. 16, which incorporates an adder 61 and the same AND gate 55. Here the logical 1 signal is fed from the output of the AND gate 55 into the adder 61 along with second weight values from the switching unit 50. As a result, the second weight values at the input at the input of the comparator 52 are found to be unity higher. This increases the probability of forming dark those of the remaining elements in the area, whose second weight values do not exceed but are only equal to the $M_2$ signal value, which they are compared with in the comparator 52. The mean brightness of the substrate area in the contour region is maintained equal to that of the original area to be reproduced.

Figure 18A:
FIG. 18a and 18b provide examples of half-tone reproductions of a continuous-tone original, obtained by using first weight values only and in accordance with the proposed invention.
Figure 18B:

Thus, the proposed device can be used to reproduce a continuous-tone original with a high geometrical accuracy of reproduction of finer details and contours thereof and without damage to smooth rendition of its tonal gradations (FIG. 18). Use can be made here of the multi-level samples of continuous-tone original areas of relatively low spatial frequency, which enables a substantial (by several tens of times) reduction of the initial video signal volume, as compared to the methods and devices, in which each substrate element to be formed has a separate area corresponding to it in the original and multi-level sample for such an area.

INDUSTRIAL APPLICABILITY

The invention can be used in graphic arts scanners, in software and hardware raster image processors used with devices for pre-press processing of graphic information, and in facsimile and electronic copier equipment.

I claim:

1. A method for adaptive screening on to a substrate of a continuous-tone original represented by multi-levels samples of an optical parameter such as optical brightness, reflection, absorption, transmission coefficient of its areas (A, B, C, D, E, F, G, H, and I) of relatively low spatial frequency, comprising the steps of dividing the substrate areas corresponding to the areas (A, B, C, D, E, F, G, H, and I) of the original into elements which spatial frequency is relatively high to that of the areas, assigning each element of the substrate areas one of first weight values, all normalized in accordance with a multi-level sample scale and selected so as to achieve the desired smooth tone rendition, and forming each element of a given substrate area first- or second-toned depending on the sampling value of the optical parameter of the original area corresponding to said substrate area, and, characterized in that the presence or absence of a contour (1) is ascertained in the original area (E) corresponding to a given substrate area and, where no contour (1) is present in said original area (E), each element of the given substrate area is formed first-toned if its first weight value exceeds the sampling value of the optical parameter of said original area (E) and second-toned if its first weight value does not exceed the sampling value of the optical parameter of said original area (E) while, with a contour (1) being present in said original area (E), said area (E) is estimated for relative busyness, each element of the given substrate area is assigned one of second weight values, all normalized in accordance with a multi-level sample scale and selected so as to achieve the desired geometrical accuracy of contour reproduction, a third weight value is obtained for each element of the given substrate area by adding up its second weight value multiplied by the relative busyness of the original area and its first weight value multiplied by the difference between unity and the relative busyness value, followed by normalizing the result of addition in accordance with the multi-level sample scale, and each element of the given substrate area is formed first-toned if its third weight value exceeds the optical parameter value of the original area corresponding to said substrate area and second-toned if its third weight value does not exceed said sampling value.

2. A method as defined in claim 1, characterized in that the presence or absence of a contour (1) in an area (E) of an original is ascertained by comparing the optical parameter value ($M_E$) of said area (E) with the sampling values of the optical parameters of the areas (F, D, B, and H) adjoining it at right, left, top, and bottom, with a contour found to be present in said area (E) if the sampling value of the optical parameter of said area (E) is found to differ from the sampling values of the optical parameters of the areas (F and D) adjoining it at right and left and/or from the sampling values of the optical parameters of the areas (B and H) adjoining it at top and bottom, and with no contour found being present in said area (E) if the sampling value of the optical parameter of said area (E) is found to be equal to at least one of the sampling values of the optical parameters of the areas (F and D) adjoining it at right and left and to at least one of the sampling values of the optical parameters of the areas (B and H) adjoining it at top and bottom.

3. A method as defined in claim 1 or 2, characterized in that the relative busyness of an area (E) of an original is determined as ratio of the maximum of the moduli of differences of an optical-parameter such as optical brightness, reflection, absorption, transmission coefficients multi-level sample values for pairs of adjacent original areas adjoining said area (E) to the maximum possible multi-level sample value of the optical parameter.

4. A method as defined in claim 1 or 2, characterized in that the relative busyness of an area of an original is determined by computing the moduli of differences of the optical-parameter sampling values for pairs of adjacent original areas including the one (E), whose relative busyness is to be determined, and at least those directly adjoining it (A, B, C, D, F, G, , H, and I), by multiplying each of the computed differences by a factor inversely related to the distance ($r_1$, $r_2$, and $r_3$) from the center of the area (E), whose relative busyness is to be determined, to the mid-segment connecting the centers of areas, of which the sampling values provide said difference, and inversely related to the number of differences characterized by said distance ($r_1$, $r_2$, and $r_3$), and by adding up the multiplication results obtained, with the ratio of the resulting total to its maximum possible value to be taken as the relative busyness value.

5. A method for adaptive screening on to a substrate of a continuous-tone original represented by multi-level samples of the optical parameter of its areas, (A, B, C, D, E, F, G, H, and I) of relatively low spatial frequency, comprising the steps of dividing the substrate areas corresponding to the original areas (A, B, C, D, B, F, G, H, and I) into elements which spatial frequency is relatively high to that of the areas, assigning each element of the substrate areas one of first weight values, all normalized in accordance with a multi-level sample scale and selected so as to achieve the desired smooth tone rendition, and forming each element of a given substrate area first- or second-toned depending on the sampling value of the optical parameter of the original area corresponding to said substrate area, and characterized in that the presence or absence of a contour (1) is ascertained in the original area (E) corresponding to a given substrate area and, where no contour (1) is present in said original area (E), each element of the given substrate area is formed first-toned if its first weight value exceeds the sampling value of the optical parameter of said original area (E) and second-toned if its first weight value does not exceed the sampling value of the optical parameter of said original area (E) while, with a contour (1) being present in said original area (E), said area is estimated for relative busyness, each element of the given substrate area is assigned one of second weight values, all normalized in accordance with a multi-level sample scale and selected so as to achieve the desired geometrical accuracy of contour reproduction, a first supplementary value $M_1=M+q(M_{max}-M)$ and a second supplementary value $M_2=M-q(M_{max}-M)$, where M is the sampling value of the optical parameter of said contour-containing original area (E), q is its relative busyness, and $M_{max}$ is the maximum possible multi-level sample value, are determined for said contour-containing original area (E), and each element of the given substrate area is formed first-toned if its first weight value exceeds the first supplementary value $M_1$, and/or if its second weight value exceeds the second supplementary value $M_2$ and second-toned if its first weight value does not exceed the first supplementary value $M_1$ and its second weight value does not exceed the second supplementary value $M_2$.

6. A method as defined in claim 5, characterized in that the presence or absence of a contour (1) in an area (E) of an original is ascertained by comparing the optical parameter value ($M_E$) of said area (E) with the sampling values of the optical parameters of the areas (F, D, B, and H) adjoining it at right, left, top, and bottom, with a contour (1) found to be present in said area (E) if the sampling value of the optical parameter of said area (E) is found to differ from the sampling values of the optical parameters of the areas (F and D) adjoining it at right and left and/or from the sampling values of the optical parameters of the areas (B and H) adjoining it at top and bottom, and with no contour (1) found being present in said area (E) if the sampling value of the optical parameter of said area (E) is found to be equal to at least one of the sampling values of the optical parameters of the areas (F and D) adjoining it at right and left and to at least one of the sampling values of the optical parameters of the areas (B and H) adjoining it at top and bottom.

7. A method as defined in claim 5 or 6, characterized in that the relative busyness of an area (E) of an original is determined as ratio of the maximum of the moduli of differences of the optical-parameter multi-level sample values for pairs of adjacent original areas adjoining said area (E) to the maximum possible multi-level sample value of the optical parameter.

8. A method as defined in claim 5 or 6, characterized in that the relative busyness of an area of an original is determined by computing the moduli of differences of the optical-parameter sampling values for pairs of adjacent original areas (A and B, A and E, B and E, etc.) including the one (E), whose relative busyness is to be determined, and at least those directly adjoining it (A, B, C, D, F, G, H, and I), by multiplying each of the computed differences by a factor inversely related to the distance ($r_1$, $r_2$, and $r_3$) from the center of the area (E), whose relative busyness is to be determined, to the mid-segment connecting the centers of areas (A and B, A and E, B and E, etc.), of which the sampling values provide said difference, and inversely related to the number of differences characterized by said distance ($r_1$, $r_2$, and $r_3$), and by adding up the multiplication results obtained, with the ratio of the resulting total to its maximum possible value to be taken as the relative busyness value.

9. A method as defined in claim 5 through 6, characterized in that, in the event of the first weight value of some one element of a given substrate area exceeding the first supplementary value $M_1$ as determined for the original area corresponding to the given substrate area, and the second weight value of said element exceeding the second supplementary value $M_2$ as determined for the original area corresponding to the given substrate area, the optical-parameter sampling value M for said original area is decreased by unity.

10. A method as defined in claim 5 or 6, characterized in that in the event of the first weight value of some one element of a given substrate area exceeding the first supplementary value $M_1$ as determined for the original area corresponding to the given substrate area, and the second weight value of said element exceeding the second supplementary value $M_2$ as determined for the original area corresponding to the given substrate area, the first or the second weight values of all the elements of the given substrate area are increased by unity.

11. A device for adaptive screening of a continuous-tone original on to a substrate, comprising a light source (3), a means (4) for the beam from said light source (3) to scan the elements of the areas of a substrate (5), corresponding to the areas of the original to be screened, a light-source beam chopper (6), a video signal source (2) with a main output ($M_E$), whose signal characterizes the optical parameter of the original area (E) corresponding to the area of the substrate (5), containing the element exposed to the beam from the light source (3), and with N supplementary outputs ($M_A$, $M_B$, $M_C$, and $M_D$), whose signals characterize the optical parameters of at least those original areas (A, B, C, and D) adjoining the area (E), whose optical parameter is characterized by the signal at the main output ($M_E$) of the video signal source (2), synchronizing means (11) with a first output (28) connected to the input of the video signal source (2) and designed to form signals at a frequency equal to the rate of displacement of the areas of the substrate (5) relative to the beam from the light-source (3), a second output (27) to form signals at a frequency equal to the rate of displacement of the elements of the substrate (5) relative to said beam in a first direction, and a third output (26) to form signals at a frequency equal to the rate of displacement of the elements of the substrate (5) relative to said beam in a second direction normal to the first direction, a source (7) of first weight values for the elements of the areas of the substrate (5), designed to ensure the desired smooth tone rendition in the original screening process, and a beam chopper control unit (9) connected to the video signal source (2) and to the first weight-value source (7) and comprising a comparator (43), of which the first input forms the first input of the beam chopper control unit (9) and is connected to the main output ($M_E$ ) of the video signal source (2) while the output forms the output of the beam chopper control unit (9) and is connected to the beam chopper (6), and characterized in that it contains additionally a source (8) of second weight values for the elements of the areas of the substrate (5), designed to ensure the desired geometrical accuracy of contour reproduction in the original screening process, said source having its inputs connected to the respective outputs of the video signal source (2) and having m outputs, where m is the number of elements in an area of the substrate (5), at which m outputs ($P_{a2}$, $P_{b2}$, $P_{c2}$, and $P_{d2}$) to form signals to characterize the second weight values for the respective elements (a, b, c, and d) of the given area of the substrate (5), and an unit (10) to estimate the relative busyness of the original areas, having N inputs connected, respectively, to the supplementary outputs ($M_A$, $M_B$, $M_C$, and $M_D$) of the video signal source (2), with the first weight-value source (7) having m outputs ($P_{a1}$, $P_{b1}$, $P_{c1}$, and $P_{d1}$), at which to form signals to characterize the first weight values for the respective elements (a, b, c, and d) of the given area of the substrate (5), and the beam chopper control unit (9) containing additionally m computing units, each with a first input forming the second input of the beam chopper control unit (9), connected to the output of the relative busyness-estimating unit (10), a second input forming one of the m third inputs of the beam chopper control unit (9), connected to the respective one of the outputs of the first weight-value source (7), a third input forming one of the m fourth inputs of the beam chopper control unit (9) and connected with that output of a second weight-value source (8), whose signal characterizes the second weight value of the element, of which the first weight value is characterized by a signal at the second input of said computing unit (40), and an output to form a signal $P'_3$ equal to $qP_2+(q_{max}-q)P_1$, where q is the signal at the first input of the computing unit (40), $P_2$ and $P_1$ are the signals at its third and second inputs, respectively, and $q_{max}$ is the maximum relative-busyness value, a scaling transformer (41) with m inputs connected to the outputs of the respective computing units (40) and m outputs, corresponding to said inputs, each to form a signal $P_3$ to characterize the third weight value of the respective element of the given area of the substrate (5), equal to $P'_3 M_{max}/P'_{3max}$, where $P'_3$ is the signal at the input of the scaling transformer (41), corresponding to a given output, $M_{max}$ is the maximum possible value of the video signal, and $P'_{3max}$ is the maximum signal of all at all the m inputs of the scaling transformer (41), a switching unit (42) with m data inputs connected to the respective outputs of the scaling transformer (41), two control inputs forming the two clock-pulse inputs of the beam chopper control unit (9) and connected to the second and third outputs (26 and 27) of the synchronizing means, respectively, and an output connected to the second input of the comparator (43) for connection to the second input of the comparator (43) of that output of the scaling transformer (41), whose signal characterizes the third weight value of the element exposed to the beam of the light source (3).

12. A device as defined in claim 11, characterized in that each computing unit (40) comprises a first and a second multiply circuits (44 and 45), a subtract circuit (46) to form a signal equal to the difference between the signal corresponding to the maximum relative busyness of an area of an original and the signal supplied to its input, and an adder (47), with the input of the subtract circuit (46) connected with the first input of the first multiply circuit (44) and forming a first input of the computing unit (40), the output of the subtract circuit (46) connected to the first input of the second multiply circuit (45), the second input of which forms a second input of the computing unit (40), the second input of the first multiply circuit (44) forming a third input of the computing unit (40), and the outputs of the first and second multiply circuits (44 and 45) connected to the inputs of the adder (47), the output of which forms the output of the computing unit (40).

13. A device as defined in claims 11 or 12, characterized in that it contains a contour detection unit (12) to form a signal corresponding to the presence of a contour in an area (E) of an original, whose optical parameter is characterized by the signal at the main output ($M_E$) of the video signal source (2), and a gating circuit (13) connected between the output of the relative busyness-estimating unit (10) and the second input of the beam chopper control unit (9), with the contour detection unit (12) having a main input connected to the main output ($M_E$) of the video signal source (2) and a group of supplementary inputs connected to at least some of the supplementary outputs ($M_A$, $M_B$, $M_C$, and $M_D$) of the video signal source (2), and an output connected to the control input of the gating circuit (13) for connection of the output of the relative busyness-estimating unit (10) to the second input of the beam chopper control unit (9) when there is a signal present at the output of the contour detection unit (12) to indicate the presence of a contour, and for disconnection of the output of the relative busyness-estimating unit (10) from the second input of the beam chopper control unit (9) when there is no such signal at the output of the contour detection unit (12).

14. A device as defined in claim 13, characterized in that the group of supplementary inputs of the contour detection unit (12) include a first, a second, a third, and a fourth inputs connected, respectively, with those four of the N supplementary outputs ($M_A$, $M_B$, $M_C$, and $M_D$) of the video signal source (2), whose signals characterize the optical parameters of those original areas (A, B, C, and D) adjoining, respectively, at top, right, bottom, and left the area (E), whose optical parameter is characterized by a signal at the main output ($M_E$) of the video signal source (2), while the contour detection unit (12) may contain four comparison circuits ($62_1$, $62_2$, $62_3$, and $62_4$), each capable of forming a signal at its output in case of its input signals being unequal, two AND gates (63 and 64), and an OR gate (65), with the main input of the contour detection unit (12) being formed by the interconnected first inputs of the comparison circuits ($62_1$, $62_2$, $62_3$, and $62_4$), the first, second, third, and fourth inputs of the contour detection unit (12) being formed by the second inputs of, respectively, the first, second, third, and fourth comparison circuits ($62_1$, $62_2$, $62_3$, and $62_4$), the outputs of the first and third comparison circuits ($62_1$ and $62_3$) being connected, respectively, with the two inputs of the first AND gate (63), the outputs of the second and fourth comparison circuits ($62_2$, and $62_4$) being connected, respectively, with the two inputs of the second AND gate (64), and the outputs of the AND gates (63 and 64) being connected, respectively, with the two inputs of the OR gate (65), whose output forms that of the contour detection unit (12).

15. A device as defined in claim 11 through 12, characterized in that the relative busyness-estimating unit (10) contains several subtract circuits (29), the number n of which will be equal to the number of binary combinations of the N inputs of said unit, with the inputs of each connected to the respective two first inputs of the relative busyness-estimating unit (10), which form one of said combinations, and a maximum-value selector unit (30), each of the n inputs of which is connected to the output of the respective subtract circuit and the output signal of which is one of its input signals, the maximum in absolute value, divided by the maximum possible video-signal value, the output of the selector unit (30) being that of the relative busyness-estimating unit (10).

16. A device as defined in claim 11 through 12, characterized in that the relative busyness-estimating unit (10) has still another input connected with the main output ($M_E$) of the video signal source (2), and contains at least two groups (31 and 32) of subtract circuits (38 and 39), each having its inputs connected to the respective two inputs of the relative busyness-estimating unit (10), whose signals will characterize the optical parameters of a pair of adjacent original areas, with each group (31 and 32) comprising subtract circuits (38 and 39), whose input signals will characterize the optical parameters of such pairs of adjacent original areas that have the same distance r from the mid-segments connecting the centers of the areas forming said pairs to the center of the area (E), whose optical parameter is characterized by the signal at the main output ($M_E$) of the video signal source (2), first adders (33 and 34) equal in number to the groups (31 and 32) of subtract circuits (38 and 39) and each having its inputs connected to the outputs of the subtract circuits (38 and 39) of the relevant group (31 and 32) for adding up the absolute signal values at the adder inputs, scaling transformers (35 and 36) equal in number to the first adders (33 and 34) and each having its input connected to the output of the respective first adder (33 and 34) for multiplying the output signal of the first adder by a value inversely related to the respective distance r and to the number of subtract circuits in the respective group (31 or 32), and a second adder (37) with its inputs connected with the outputs of the scaling transformers (35 and 36) for forming a signal equal to the sum of its input signals, divided by the maximum possible value of said sum, the output of the second adder (37) being that of the relative busyness-estimating unit (10).

17. A device for adaptive screening of a continuous-tone original on to a substrate, comprising a light source (3), a means (4) for the beam from said light source (3) to scan the elements of the areas of a substrate (5), corresponding to the areas of the original to be screened, a light-source beam chopper (6), a video signal source (2) with a main output ($M_E$), whose signal characterizes the optical parameter of the original area (E) corresponding to the area of the substrate (5), containing the element exposed to the beam from the light source (3), and with N supplementary outputs ($M_A$, $M_B$, $M_C$, and $M_D$), whose signals characterize the optical parameters of at least those original areas (A, B, C, and D) adjoining the area (E), whose optical parameter is characterized by the signal at the main output ($M_E$) of the video signal source (2), synchronizing means (11) with a first output (28) connected to the input of the video signal source (2) and designed to form signals at a frequency equal to the rate of displacement of the areas of the substrate (5) relative to the beam from the light-source (3), a second output (27) to form signals at a frequency equal to the rate of displacement of the elements of the substrate (5) relative to said beam in a first direction, and a third output (26) to form signals at a frequency equal to the rate of displacement of the elements of the substrate (5) relative to said beam in a second direction normal to the first direction, a source (7) of first weight values for the elements of the substrate (5), designed to ensure the desired smooth tone rendition in the original screening process, and a beam chopper control unit (9) connected to the video signal source (2) and to the first weight-value source (7) and comprising a first comparator (51), and characterized in that it contains additionally a source (8) of second weight values for the elements of the areas of the substrate (5), designed to ensure the desired geometrical accuracy of contour reproduction in the original screening process, said source having its inputs connected to the respective outputs of the video signal source (2) and having m outputs, where m is the number of elements in an area of the substrate (5), at which m outputs ($Pa_2$, $P_{b2}$, $P_{c2}$, and $P_{d2}$) to form signals to characterize the second weight values for the respective elements (a, b, c, and d) of the given area of the substrate (5), and an unit (10) to estimate the relative busyness of the original areas, having N inputs connected, respectively, to the supplementary outputs ($M_A$, $M_B$, $M_C$, and $P_D$) of the video signal source (2), with the first weight-value source (7) having m outputs ($P_{a1}$, $P_{b1}$, $P_{c1}$, and $P_{d1}$), at which to form signals to characterize the first weight values of the respective elements (a, b, c, and d) of the given area of the substrate (5), and the beam chopper control unit (9) containing additionally a second comparator (52), a computing unit (48) with a first input connected to the first input of the beam chopper control unit (9), connected with the main output ($M_E$) of the video signal source (2), a second input forming a second input of the beam chopper control unit (9), connected to the output of the relative busyness-estimating unit (10), a first output connected to the first input of the first comparator (51), and a second output connected to the first input of the second comparator (52), the computing unit (48) being capable of producing at its first output a signal $M_1$ equal to $M+q(M_{max}-M)$ and at its second output a signal $M_2$ equal to $M_{max}-q(M_{max}-M)$, where M is the signal at the first input of the computing unit (48), q is the signal at the second input of the computing unit (48), and $M_{max}$ is the maximum possible video-signal value, a first switching unit (49) with m data inputs forming m third inputs of the beam chopper control unit (9), connected to the respective outputs ($P_{a1}$, $P_{b1}$, $P_{c1}$, and $P_{d1}$) of the first weight-value source (7), two control inputs forming the clock-pulse inputs of the beam chopper control unit (9) and connected, respectively, to the second and third outputs (27 and 26) of the synchronizing means (11), and an output connected to the second input of the first comparator (51) for connection to the second input of the first comparator (51) of that output of the m outputs of the first weight-value source (7), whose signal characterizes the first weight value of the element of the substrate (5), exposed to the beam of the light source (3), a second switching unit (50) with m data inputs forming m fourth inputs of the beam chopper control unit (9), connected to the respective outputs ($P_{a2}$, $P_{b2}$, $P_{c2}$, and $P_{d2}$) of the second weight-value source (8), two control inputs connected to the respective two control inputs of the first switching unit (49), and an output connected to the second input of the second comparator (52) for connection to the second input of the second comparator (52) of that output of the m outputs of the second weight-value source (8), whose signal characterizes the second weight value of the element of the substrate (5), exposed to the beam from the light source (3), and an OR gate (53), the two inputs of which are connected, respectively, to the outputs of the first and second comparators (51 and 52) while the output forms an output of the beam chopper control unit (9), connected to the input of the beam chopper (6).

18. A device as defined in claim 17, characterized in that the beam chopper control unit (9) to contains additionally a subtract circuit (54) connected between its first input and the first input of the computing unit (48), and an AND gate (55) with its two inputs connected with the outputs of the first and second comparators (51 and 52), respectively, with the first input of the beam chopper control unit (9) connected to the first input of the subtract circuit (54), and the output of the AND gate (55) connected to the second input of the subtract circuit (54).

19. A device as defined in claim 17, characterized in that the beam chopper control unit (9) to contains additionally an adder (61) connected between the output of the first or second switching unit (49 or 50) and the second input of, respectively, the first or second comparator (51 or 52), and an AND gate (55) with its two inputs connected, respectively, with the outputs of the first and second comparators (51 and 52), for the first input of an adder (61) connected to the output of the first or second switching unit (49 or 50), and for the second input of the adder to be connected to the output of the AND gate (55).

20. A device as defined in any one of claims 17, 18 or 19 characterized in that the computing unit (48) contains a first and a second subtract circuits (56 and 57), a multiply circuit (59), a maximum video-signal value source (58), and an adder (60), with the first input of the first subtract circuit (56) forming the first input of the computing unit (48) and being connected with the first input of the adder (60), the second input of the first subtract circuit (56) being connected with the output of the maximum video-signal value source (58) and with the first input of the second subtract circuit (57), the output of the first subtract circuit (56) being connected with the first input of the multiply circuit (59), of which the second input forms the second input of the computing unit (48) and the output is connected to the second input of the adder (60) and to the second input of the second subtract circuit (57), the output of the adder (60) being the first output of the computing unit (48), and the output of the second subtract circuit (57) being the second output of the computing unit (48).

21. A device as defined in anyone of claims 17, 18 or 19 characterized in that the relative busyness-estimating unit (10) contains several subtract circuits (29), the number n of which will be equal to the number of binary combinations of the N inputs of said unit, with the inputs of each connected to the respective two first inputs of the relative busyness-estimating unit (10), which form one of said combinations, and a maximum-value selector unit (30), each of the n inputs of which is connected to the output of the respective subtract circuit and the output signal of which is one of its input signals, the maximum in absolute value, divided by the maximum possible video-signal value, the output of the selector unit (30) being that of the relative busyness-estimating unit (10).

22. A device as defined in any one of claims 17, 18 or 19 characterized in that the relative busyness-estimating unit (10) has still another input connected with the main output ($M_E$) of the video signal source (2), and contains at least two groups (31 and 32) of subtract circuits (38 and 39), each having its inputs connected to the respective two inputs of the relative busyness-estimating unit (10), whose signals will characterize the optical parameters of a pair of adjacent original areas, with each group (31 and 32) comprising subtract circuits (38 and 39), whose input signals will characterize the optical parameters of such pairs of adjacent original areas that have the same distance r from the mid-segments connecting the centers of the areas forming said pairs to the center of the area (E), whose optical parameter is characterized by the signal at the main output ($M_E$) of the video signal source (2), first adders (33 and 34) equal in number to the groups (31 and 32) of subtract circuits (38 and 39) and each having its inputs connected to the outputs of the subtract circuits (38 and 39) of the relevant group (31 and 32) for adding up the absolute signal values at the adder inputs, scaling transformers (35 and 36) equal in number to the first adders (33 and 34) and each having its input connected to the output of the respective first adder (33 and 34) for multiplying the output signal of the first adder by a value inversely related to the respective distance r and to the number of subtract circuits in the respective group (31 or 32), and a second adder (37) with its inputs connected with the outputs of the scaling transformers (35 and 36) for forming a signal equal to the sum of its input signals, divided by the maximum possible value of said sum, the output of the second adder (37) being that of the relative busyness-estimating unit (10).

23. A device as defined in any one of claims 17, 18 or 19 characterized in that it contains a contour detection unit (12) to form a signal corresponding to the presence of a contour in an area (E) of an original, whose optical parameter is characterized by the signal at the main output ($M_E$) of the video signal source (2), and a gating circuit (13) connected between the output of the relative busyness-estimating unit (10) and the second input of the beam chopper control unit (9), with the contour detection unit (12) having a main input connected to the main output ($M_E$) of the video signal source (2) and a group of supplementary inputs connected to at least some of the supplementary outputs ($M_A$, $M_B$, $M_C$, and $M_D$) of the video signal source (2), and an output connected to the control input of the gating circuit (13) for connection of the output of the relative busyness-estimating unit (10) to the second input of the beam chopper control unit (9) when there is a signal present at the output of the contour detection unit (12) to indicate the presence of a contour, and for disconnection of the output of the relative busyness-estimating unit (10) from the second input of the beam chopper control unit (9) when there is no such signal at the output of the contour detection unit (12).

24. A device as defined in claim 23, characterized in that the group of supplementary inputs of the contour detection unit (12) include a first, a second, a third, and a fourth inputs connected, respectively, with those four of the N supplementary outputs ($M_A$, $M_B$, $M_C$, and $M_D$) of the video signal source (2), whose signals characterize the optical parameters of those original areas (A, B, C, and D) adjoining, respectively, at top, right, bottom, and left the area (E), whose optical parameter is characterized by a signal at the main output ($M_E$) of the video signal source (2), while the contour detection unit (12) may contain four comparison circuits ($62_1$, $62_2$, $62_3$, and $62_4$), each capable of forming a signal at its output in case of its input signals being unequal, two AND gates (63 and 64), and an OR gate (65), with the main input of the contour detection unit (12) being formed by the interconnected first inputs of the comparison circuits ($62_1$, $62_2$, $62_3$, and $62_4$), the first, second, third, and fourth inputs of the contour detection unit (12) being formed by the second inputs of, respectively, the first, second, third, and fourth comparison circuits ($62_1$, $62_2$, $62_3$, and $62_4$), the outputs of the first and third comparison circuits ($62_1$ and $62_3$) being connected, respectively, with the two inputs of the first AND gate (63), the outputs of the second and fourth comparison circuits ($62_2$, and $62_4$) being connected, respectively, with the two inputs of the second AND gate (64), and the outputs of the AND gates (63 and 64) being connected, respectively, with the two inputs of the OR gate (65), whose output forms that of the contour detection unit (12).

* * * * *